United States Patent
Takahara et al.

(10) Patent No.: US 9,806,625 B2
(45) Date of Patent: Oct. 31, 2017

(54) POWER CONVERSION DEVICE INCLUDING A TRANSFORMER WITH THREE OR MORE WINDINGS

(71) Applicant: Mitsubishi Electric Corporation, Chiyoda-ku (JP)

(72) Inventors: Takaaki Takahara, Tokyo (JP); Satoshi Murakami, Tokyo (JP); Ryota Kondo, Tokyo (JP); Masaki Yamada, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/917,082

(22) PCT Filed: Oct. 20, 2014

(86) PCT No.: PCT/JP2014/077846
§ 371 (c)(1),
(2) Date: Mar. 7, 2016

(87) PCT Pub. No.: WO2015/060255
PCT Pub. Date: Apr. 30, 2015

(65) Prior Publication Data
US 2016/0204707 A1 Jul. 14, 2016

(30) Foreign Application Priority Data
Oct. 23, 2013 (JP) ................ 2013-219943

(51) Int. Cl.
*H02M 3/335* (2006.01)
*H02M 1/08* (2006.01)
(Continued)

(52) U.S. Cl.
CPC ..... *H02M 3/33546* (2013.01); *B60L 11/1812* (2013.01); *B60L 11/1816* (2013.01);
(Continued)

(58) Field of Classification Search
CPC ........................... H02M 3/33546; H02M 1/08
See application file for complete search history.

(56) References Cited

U.S. PATENT DOCUMENTS

| | | | |
|---|---|---|---|
| 7,675,759 B2 * | 3/2010 | Artusi | H02M 1/4225 363/21.01 |
| 7,778,056 B2 * | 8/2010 | Geissler | B23K 9/1043 363/53 |

(Continued)

FOREIGN PATENT DOCUMENTS

| | | |
|---|---|---|
| JP | 2008-109754 A | 5/2008 |
| JP | 4263736 B | 5/2008 |

(Continued)

OTHER PUBLICATIONS

International Search Report dated Dec. 22, 2014, in PCT/JP2014/077846 filed Oct. 20, 2014.

*Primary Examiner* — Emily P Pham
(74) *Attorney, Agent, or Firm* — Oblon, McClelland, Maier & Neustadt, L.L.P.

(57) ABSTRACT

A power conversion device that distributes input power to multiple outputs in accordance with power requirement of a load, using a plurality of magnetically coupled windings. In the case of supplying power from an AC power supply, at least one of an AC/DC converter and first to fourth switching circuits controls voltage on an output side of the AC/DC converter, based on a deviation between a detected value and a target value of the voltage. In the case of supplying power from a first DC voltage source or a second DC voltage source, the second switching circuit or the fourth switching circuit provided between the first DC voltage source or the second DC voltage source and the transformer supplies power based on an arbitrary time ratio.

15 Claims, 32 Drawing Sheets

(51) Int. Cl.
  *H02M 1/42* (2007.01)
  *B60L 11/18* (2006.01)
  *H02M 1/00* (2006.01)
  *H02M 7/04* (2006.01)
  *H02M 7/487* (2007.01)
  *H02M 7/5387* (2007.01)

(52) U.S. Cl.
  CPC ........... *H02M 1/08* (2013.01); *H02M 1/4258* (2013.01); *H02M 3/33561* (2013.01); *H02M 3/33569* (2013.01); *H02M 3/33584* (2013.01); *H02M 3/33592* (2013.01); *B60L 2210/30* (2013.01); *H02M 7/04* (2013.01); *H02M 7/487* (2013.01); *H02M 7/5387* (2013.01); *H02M 2001/007* (2013.01); *H02M 2001/0009* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 7,928,600 B2 * | 4/2011 | Hishikawa | G01R 33/3614 307/17 |
| 2007/0076445 A1 * | 4/2007 | Boke | H02M 3/3376 363/17 |
| 2008/0094859 A1 | 4/2008 | Takayanagi et al. | |
| 2008/0101096 A1 | 5/2008 | Takayanagi et al. | |
| 2012/0091970 A1 * | 4/2012 | Cho | H02J 7/022 320/160 |

FOREIGN PATENT DOCUMENTS

| | | |
|---|---|---|
| JP | 2009-177940 A | 8/2009 |
| JP | 2010-178566 A | 8/2010 |
| WO | 2015/059949 A1 | 4/2015 |

* cited by examiner

FIG. 20

POWER CONVERSION DEVICE INCLUDING A TRANSFORMER WITH THREE OR MORE WINDINGS

TECHNICAL FIELD

The present invention relates to a power conversion device capable of power distribution control of input power to multiple outputs.

BACKGROUND ART

Some conventional power conversion devices have a multioutput power supply configuration obtained by using complex windings for a transformer (for example, see Patent Document 1 shown below). That is, an object of the power conversion device in this conventional technology is to, in charging two DC voltage sources with power from an AC power supply using the transformer having the complex windings magnetically coupled with each other, set a priority on one of the DC voltage sources to perform the charging. In the case where there is no AC power supply, one of the DC voltage sources is used as a supply source to charge the other DC voltage source by means of bidirectional switch.

CITATION LIST

Patent Document

Patent Document 1: Japanese Patent No. 4263736

SUMMARY OF THE INVENTION

Problems to be Solved by the Invention

However, in the conventional power conversion device disclosed in Patent Document 1, a bidirectional switch circuit for controlling charging is formed by a switching element and a diode connected in antiparallel to the switching element. Therefore, even if the amount of power received by each DC voltage source is to be controlled through PWM control using the bidirectional switch circuit, since the power is rectified by the diode connected in a bridge form, the amount of charge to each DC voltage source cannot be controlled, resulting in a problem that it is impossible to perform distribution control of AC input power.

The present invention has been made to solve the above problem, and an object of the present invention is to provide a power conversion device capable of performing, using a plurality of magnetically coupled windings, power distribution control of input power to multiple outputs in accordance with power requirement of a load.

Solution to the Problems

A power conversion device according to the present invention includes: a transformer composed of three or more windings magnetically coupled with each other; a first switching circuit connected to one or more of the windings; an AC/DC converter having a DC side connected to an input part of the first switching circuit, and converting input power from an AC power supply to DC; a voltage detector for detecting DC side voltage of the AC/DC converter; and a switching circuit and a load which are connected to the other one or more of the windings, wherein at least one of the AC/DC converter, the first switching circuit, and the switching circuit controls voltage on an output side of the AC/DC converter, based on a deviation between a detected value and a target value of the voltage, and the switching circuit on a load side connected via the transformer controls voltage or current on the load side, based on a deviation between a detected value and a target value of the voltage or current, thereby distributing supply power in accordance with a load condition.

Effect of the Invention

In the power conversion device according to the present invention, the switching circuit between the load that requires power and the transformer outputs power based on the deviation between the detected value and the target value of voltage or current of the load, enabling power distribution control of input power to multiple outputs in accordance with a load condition.

BRIEF DESCRIPTION OF THE DRAWINGS

FIG. 20 is a diagram for explaining a power flow in the power conversion device according to embodiment 2 of the present invention.

DESCRIPTION OF EMBODIMENTS

Embodiment 1

Figure 1:
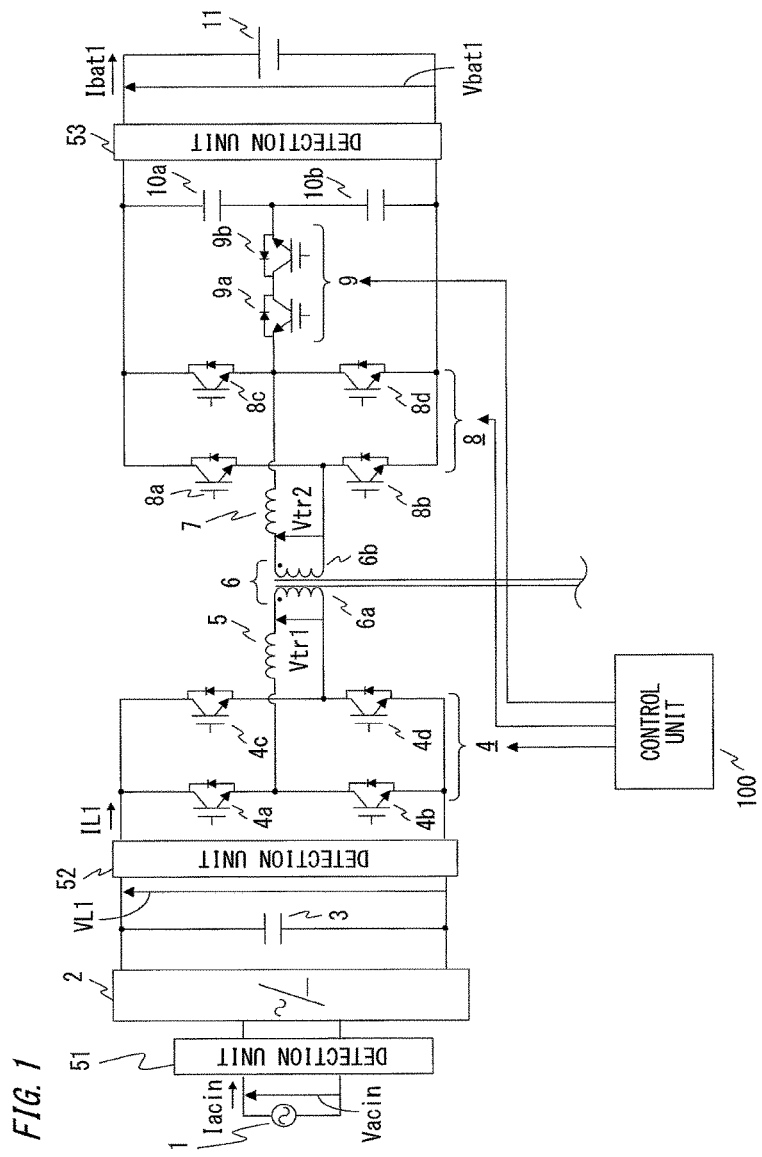
FIG. 1 is a circuit configuration diagram of a power conversion device according to embodiment 1 of the present invention.
Figure 2:
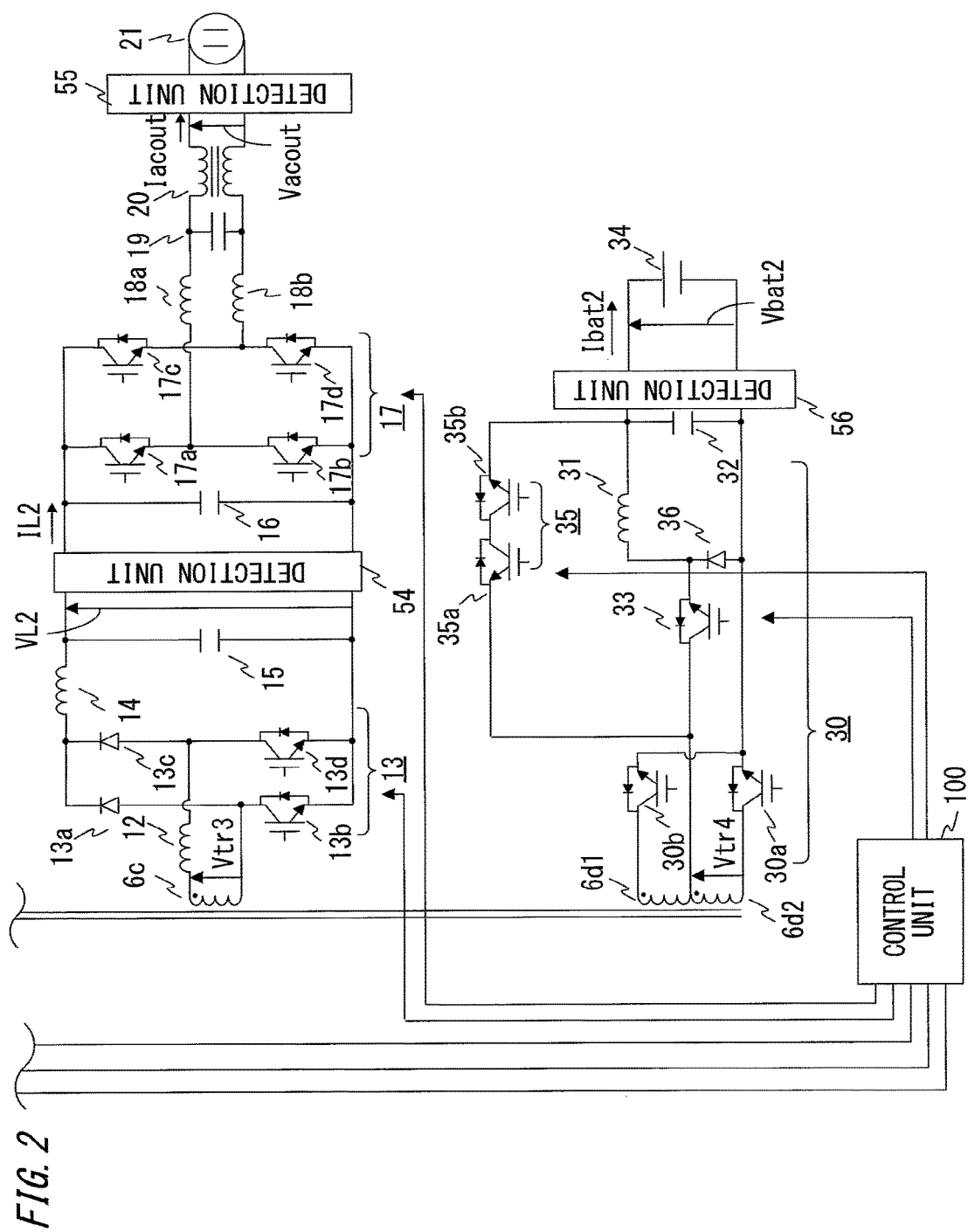
FIG. 2 is a circuit configuration diagram of the power conversion device according to embodiment 1 of the present invention.

FIG. 1 and FIG. 2 are circuit configuration diagrams of a power conversion device according to embodiment 1 of the present invention.

The power conversion device of the present embodiment 1 is applied to, for example, a power supply system involving a charger for an electric vehicle. The power conversion device is applicable to a power supply system in which: an AC power supply 1 is a commercial AC power supply, a private power generator, or the like; a first DC voltage source 11 is a high-voltage battery for vehicle travelling; a second DC voltage source 34 is a battery such as a lead battery which is a power supply for a vehicle electric component; and an inverter 17 supplies power of AC 100V which can be used in the vehicle.

The AC power supply 1 is connected to an AC/DC converter 2 via a voltage current detector 51. AC voltage Vacin is stored as DC voltage VL1 in a capacitor 3. The DC voltage VL1 is converted to AC voltage Vtr1 by a first switching circuit 4. The first switching circuit 4 functions as an inverter having four switching elements 4a to 4d connected in a bridge form, and controls the power reception amount of input power from the AC power supply 1.

A first end of a step-up coil 5 is connected to a first AC end of the first switching circuit 4, and a first end of a first winding 6a on a primary side of a complex winding transformer (hereinafter, simply referred to as a transformer) 6 is connected to a second end of the step-up coil 5. A second end of the first winding 6a is connected to a second AC end of the first switching circuit 4.

A first end of a second winding 6b on a secondary side of the transformer 6 is connected to a first end of a step-up coil 7, and a second end of the step-up coil 7 is connected to a first AC end of a second switching circuit 8 and a first end of a switch 9 including two switching elements 9a and 9b. A second end of the second winding 6b is connected to a second AC end of the second switching circuit 8. The second switching circuit 8 has four switching elements 8a to 8d connected in a bridge form, and functions as a step-up chopper when the first DC voltage source 11 is to be charged.

A second end of the switch 9 is connected to a connection point between two capacitors 10a and 10b connected in series. A DC plus terminal of the second switching circuit 8 is connected to another end of the capacitor 10a, and to a plus end of the first DC voltage source 11 via a voltage current detector 53. A DC minus terminal of the second switching circuit 8 is connected to another end of the capacitor 10b, and to a minus end of the first DC voltage source 11 via the voltage current detector 53. Here, the two capacitors 10a and 10b have the same capacitor capacitance.

A first end of a third winding 6c on a tertiary side of the transformer 6 is connected to a first end of a step-up coil 12, and a second end of the step-up coil 12 is connected to a first AC end of a third switching circuit 13. A second end of the third winding 6c is connected to a second AC end of the third switching circuit 13. The third switching circuit 13 is formed by two legs connected in parallel, one of which is composed of a rectification element 13a and a switching element 13b connected in series, and the other one of which is composed of a rectification element 13c and a switching element 13d connected in series. The third switching circuit 13 normally functions as a rectification circuit, and when DC voltage VL2 occurring on a smoothing capacitor 15 described later is lower than a predetermined value, functions as a step-up chopper.

AC voltage Vtr3 occurring on the third winding 6c of the transformer 6 is converted to DC by the third switching circuit 13, smoothed by a smoothing coil 14 and the smoothing capacitor 15, and then stored, as DC voltage VL2, in a capacitor 16 via a voltage current detector 54. The capacitor 16 is connected to a DC input end of the inverter 17 composed of four switching elements 17a to 17d. To an AC output end of the inverter 17, smoothing coils 18a and 18b, a smoothing capacitor 19, a common mode choke coil 20, a voltage current detector 55, and a load device connection end 21 are connected in this order. At the load device connection end 21, AC voltage Vacout is generated which is a power supply for supplying power to various devices (not shown) (hereinafter, referred to as an AC load) connected to the load device connection end 21.

Fourth windings 6d1 and 6d2 on a quaternary side of the transformer 6 are configured in a center-tap form, and first ends of two switching elements 30a and 30b composing a fourth switching circuit 30 are respectively connected to both ends of the fourth windings 6d1 and 6d2. To a connection point as the center tap between the fourth windings 6d1 and 6d2, a switching element 33 is connected and also a switch 35 composed of two switching elements 35a and 35b is connected.

An output side of the switching element 33 is connected to a connection point between a flyback diode 36 and a smoothing coil 31. Output of the smoothing coil 31, output of the switch 35, and a first end of a smoothing capacitor 32 are mutually connected, and then connected to a plus end of the second DC voltage source 34 via a voltage current detector 56. Second ends of the switching elements 30a and 30b are connected to each other, and are connected to an anode end of the flyback diode 36, a second end of the smoothing capacitor 32, and a minus end of the second DC voltage source 34. The fourth switching circuit 30 is composed of the two switching elements 30a and 30b, the switching element 33, the flyback diode 36, and the smoothing coil 31. A unit composed of the switching element 33, the flyback diode 36, and the smoothing coil 31 functions as a step-down chopper.

Each switching element composing the first to fourth switching circuits 4, 8, 13, and 30, and each switching element composing the inverter 17 may be IGBTs (Insulated Gate Bipolar Transistor), MOSFETs (Metal Oxide Semiconductor Field Effect Transistor), or the like.

A control unit 100 has a function of controlling operations of the first to fourth switching circuits 4, 8, 13, and 30 and the inverter 17.

Next, the summary of power distribution in the power conversion device having the above configuration will be described.

In the case where the AC power supply 1 is connected and the AC power supply 1 is used as a power supply source for the power supply system, the voltage Vacin of the AC power supply 1 is converted to the DC voltage VL1 by the AC/DC converter 2, and the DC voltage VL1 is converted to secondary-side DC voltage Vbat1 isolated by the transformer 6, to charge the first DC voltage source 11. In addition, the DC voltage VL1 is converted to tertiary-side DC voltage VL2 isolated by the transformer 6, and then is converted from DC to AC by the inverter 17, to generate AC voltage Vacout for the AC load connected to the load device connection end 21. Further, the DC voltage VL1 is converted to quaternary-side DC voltage Vbat2 isolated by the transformer 6, to charge the second DC voltage source 34.

In the case where the AC power supply 1 is not connected and therefore the first DC voltage source 11 is used as a power supply source for the power supply system, the voltage Vbat1 of the first DC voltage source 11 is converted to the tertiary-side DC voltage VL2 isolated by the transformer 6, and then is converted from DC to AC by the inverter 17, to generate the AC voltage Vacout for the AC load connected to the load device connection end 21. In addition, the voltage Vbat1 of the first DC voltage source 11 is converted to the quaternary-side DC voltage Vbat2 isolated by the transformer 6, to charge the second DC voltage source 34.

In the case where the AC power supply 1 is not connected and the second DC voltage source 34 is used as a power supply source for the power supply system because the charge amount of the first DC voltage source 11 is insufficient, the voltage Vbat2 of the second DC voltage source 34 is converted to the tertiary-side DC voltage VL2 isolated by the transformer 6, and then, from the DC voltage VL2, the AC power supply Vacout for the AC load connected to the load device connection end 21 is generated by the inverter 17. In addition, the voltage Vbat2 of the second DC voltage source 34 is converted to the secondary-side DC voltage Vbat1 isolated by the transformer 6, to charge the first DC voltage source 11.

Next, a power flow in the power conversion device according to embodiment 1 of the present invention will be described with reference to FIG. 3 to FIG. 14.

Figure 3:
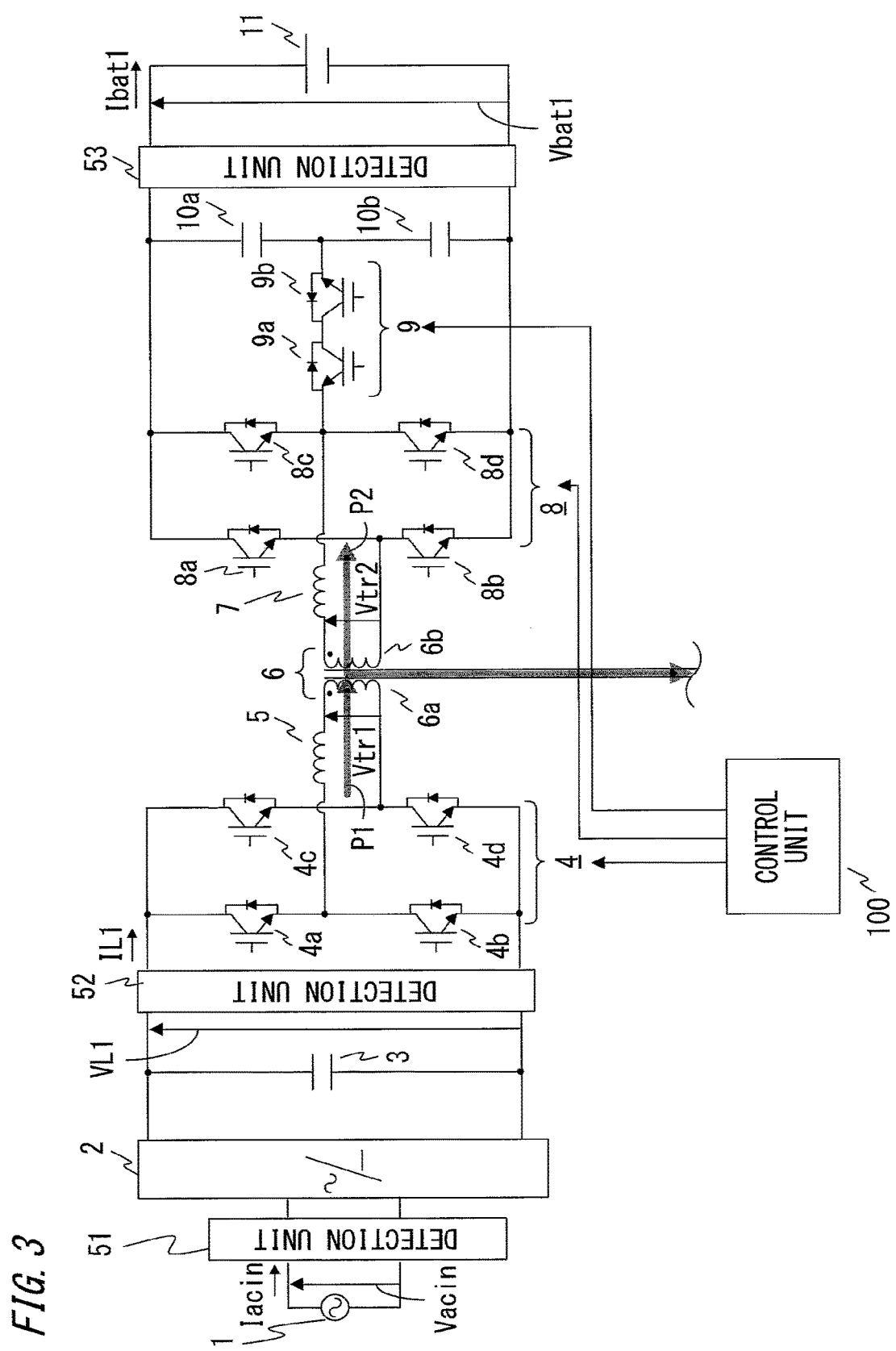
FIG. 3 is a diagram for explaining a power flow in the power conversion device according to embodiment 1 of the present invention.
Figure 4:
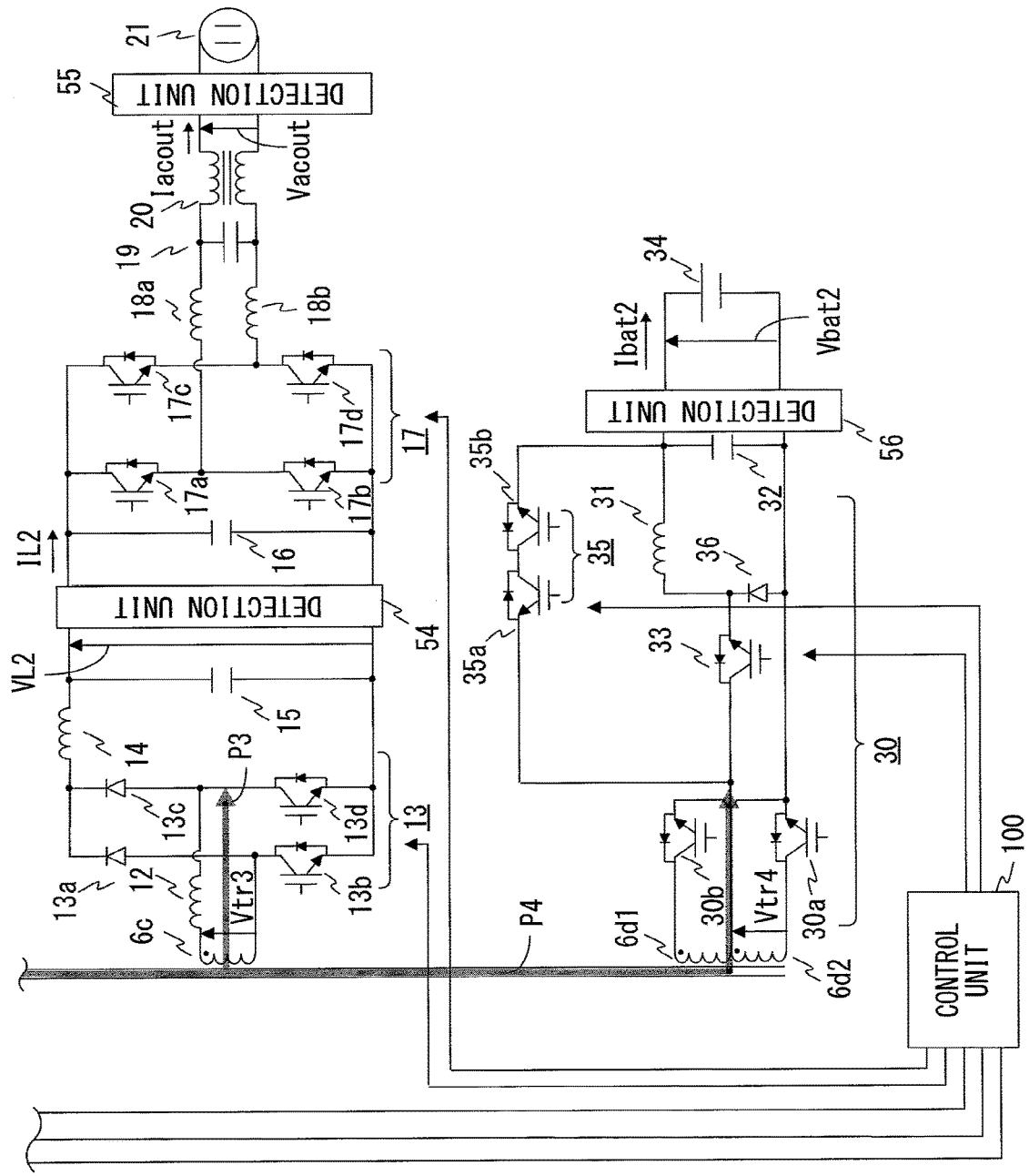
FIG. 4 is a diagram for explaining a power flow in the power conversion device according to embodiment 1 of the present invention.

As shown in FIG. 3 and FIG. 4, in the case where the AC power supply 1 is connected and is used as a power supply source for the power supply system, input power P1 from the AC power supply 1 is distributed into charge power P2 for the first DC voltage source 11, supply power P3 for the AC load connected to the load device connection end 21, and charge power P4 for the second DC voltage source 34.

FIG. 5 to FIG. 8 are block diagrams of the control unit 100 for realizing the power flows shown in FIG. 3 and FIG. 4.

Figure 5:
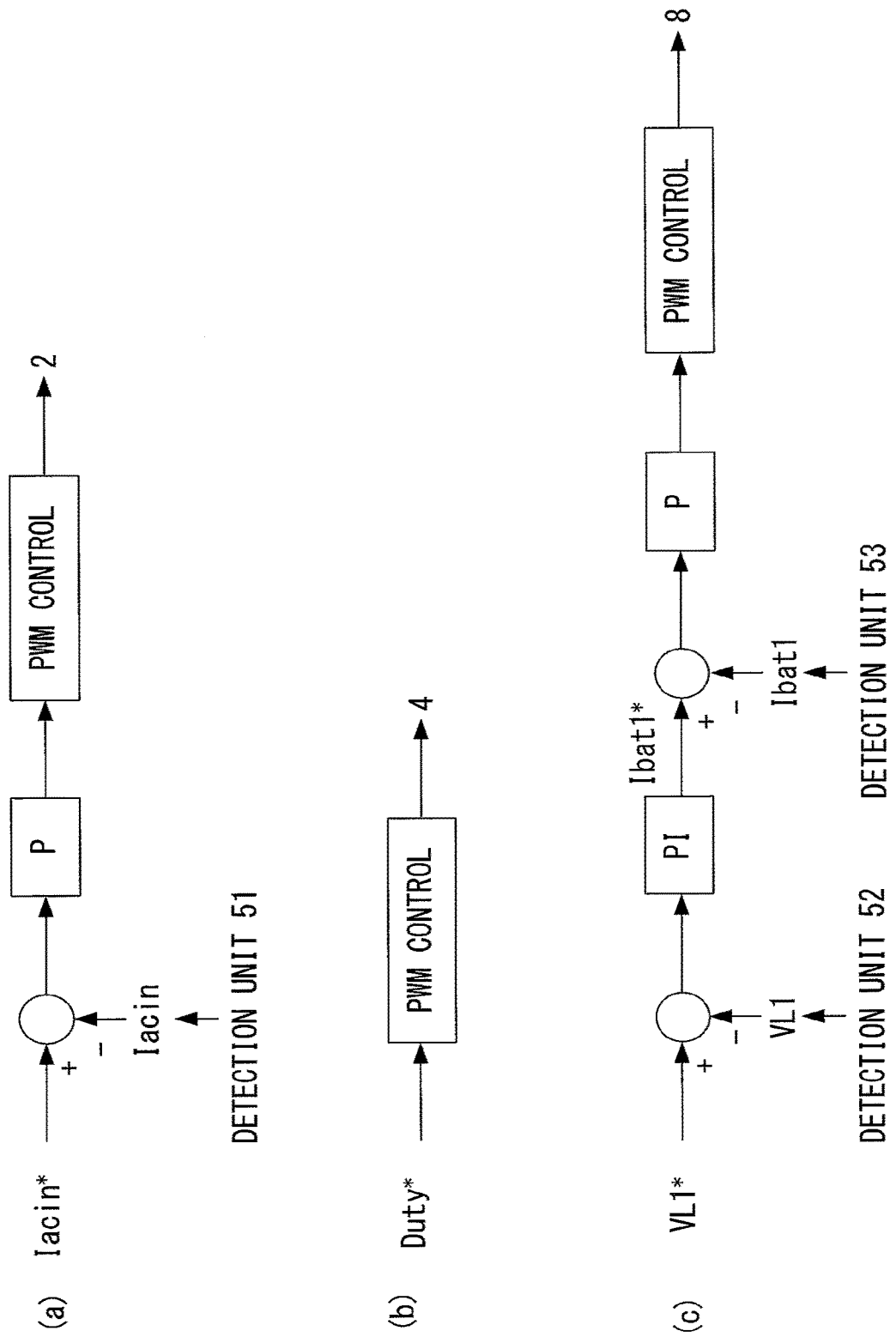
FIG. 5 is a block diagram of a control unit for realizing the power flows shown in FIG. 3 and FIG. 4.
Figure 6:
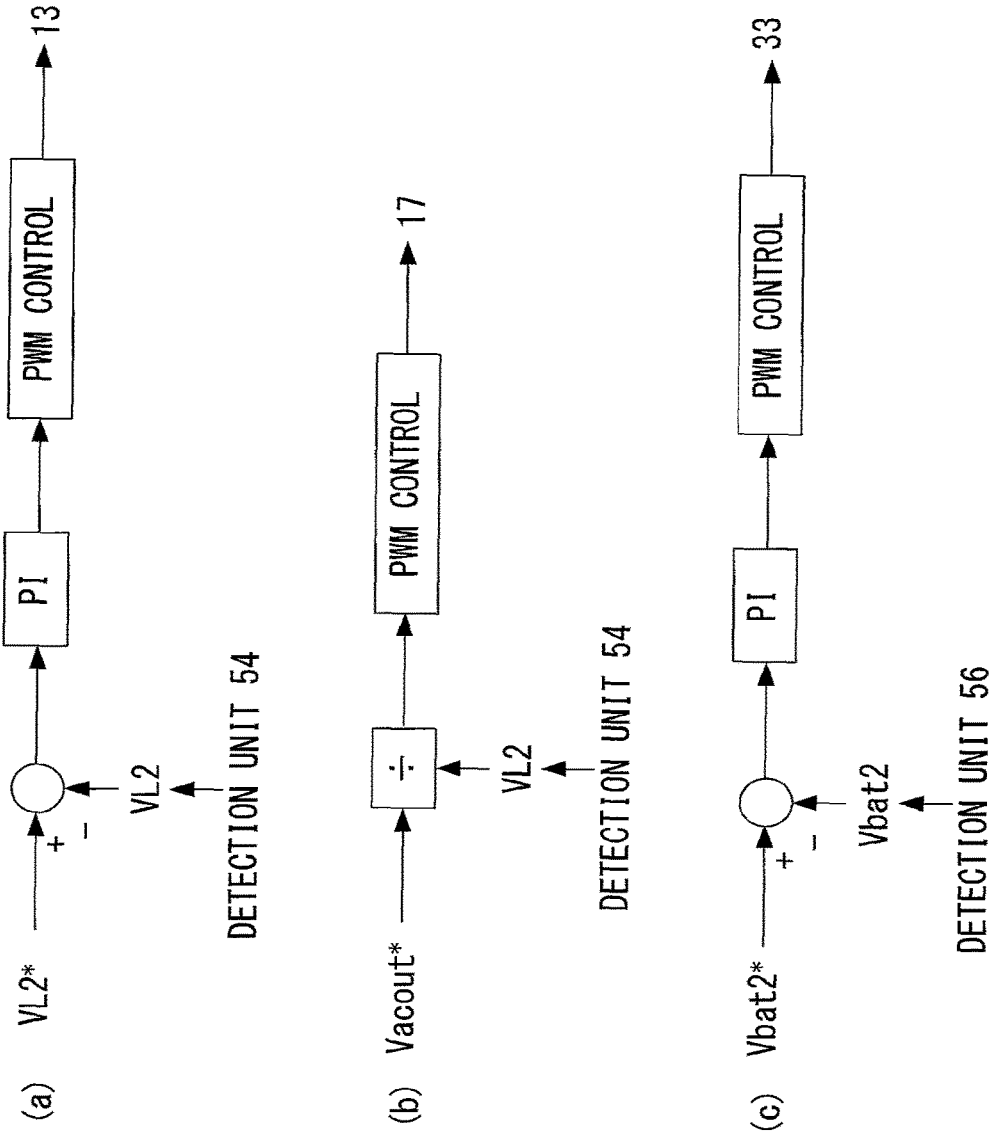
FIG. 6 is a block diagram of the control unit for realizing the power flows shown in FIG. 3 and FIG. 4.

The block diagrams in FIG. 5 and FIG. 6 show the case of performing operation so as to prioritize the supply power P3 for the AC load connected to the load device connection end 21 and the charge power P4 for the second DC voltage source 34 and supply the remaining power as the charge power P2 for the first DC voltage source 11. In this case, the AC/DC converter 2 supplies power at constant current. That is, for the AC/DC converter 2, based on a deviation between a current command value Iacin* for the AC power supply 1 and a current detection value Iacin from the voltage current detector 51, proportional control (P control) is performed, and then PWM control is performed, thereby supplying power at constant current to the capacitor 3 and at the same time, controlling the AC current at a high power factor (see FIG. 5(a)). At this time, the current command value Iacin* for the AC power supply 1 may be arbitrarily set. The first switching circuit 4 performs PWM operation at a constant time ratio based on an arbitrary time ratio command value Duty*, thereby supplying AC power to the transformer 6 (see FIG. 5(b)).

For the second switching circuit 8, based on a deviation between a voltage command value VL1* for the capacitor 3 and the voltage detection value VL1 from the voltage current detector 52, proportional integral control (PI control) is performed to obtain a current command value Ibat1* for the first DC voltage source 11. Then, based on a deviation between the current command value Ibat1* and the current detection value Ibat1 from the voltage current detector 53, proportional control (P control) is performed, and then PWM control is performed, thereby performing charge current control for the first DC voltage source 11 (see FIG. 5(c)).

For the third switching circuit 13, based on a deviation between a voltage command value VL2* for the smoothing capacitor 15 and the voltage detection value VL2 from the voltage current detector 54, proportional integral control (PI control) is performed, and then PWM control is performed, thereby controlling the voltage VL2 of the smoothing capacitor 15 (see FIG. 6(a)). For the inverter 17, using a quotient between a command value Vacout* for the output AC voltage and the voltage detection value VL2 from the voltage current detector 54 as a modulation factor for a sinewave inverter, PWM control is performed, thereby outputting the AC voltage Vacout to the load device connection end 21 (see FIG. 6(b)).

For the switching element 33 composing the fourth switching circuit 30, based on a deviation between a voltage command value Vbat2* for the second DC voltage source 34 and the voltage detection value Vbat2 from the voltage current detector 56, proportional integral control (PI control) is performed, and then PWM control is performed, thereby performing charge voltage control for the second DC voltage source 34 (see FIG. 6(c)).

Thus, in the controls shown in FIG. 5 and FIG. 6, operation is performed such that constant input power P1 is received from the AC power supply 1 to output the supply power P3 for the AC load connected to the load device connection end 21 and the charge power P4 for the second DC voltage source 34, and the remaining power is supplied as the charge power P2 for the first DC voltage source 11.

The switching element 33 of the fourth switching circuit 30 may be operated so as to make the voltage VL1 of the capacitor 3 constant, and the second switching circuit 8 may be controlled so as to make voltage or current of the first DC voltage source 11 constant, whereby constant input power P1 may be received from the AC power supply 1 to output the supply power P3 for the AC load connected to the load device connection end 21 and the charge power P1 for the first DC voltage source 11, and the remaining power may be supplied as the charge power P4 for the second DC voltage source 34.

Figure 7:
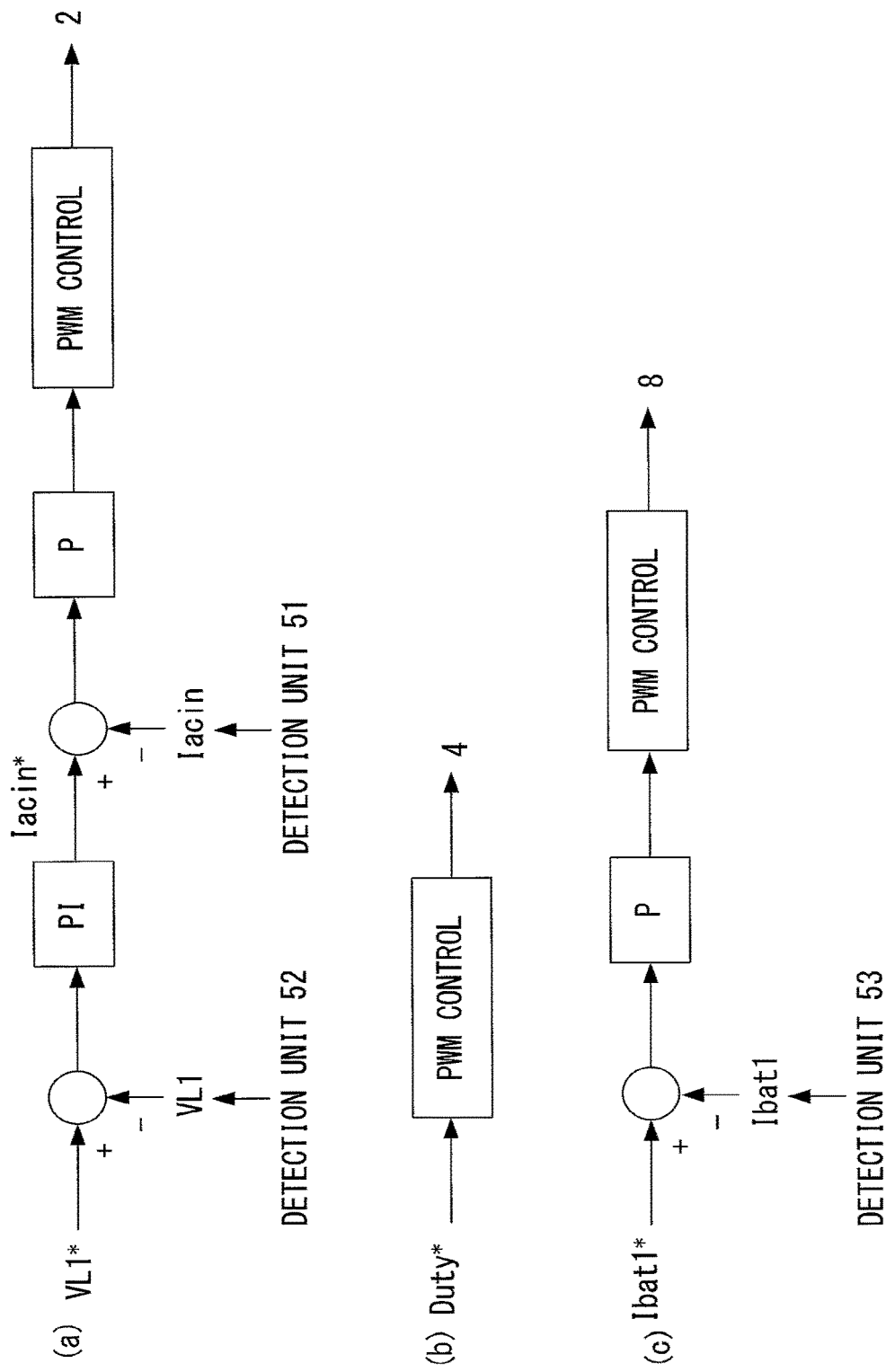
FIG. 7 is a block diagram of the control unit for realizing the power flows shown in FIG. 3 and FIG. 4.
Figure 8:
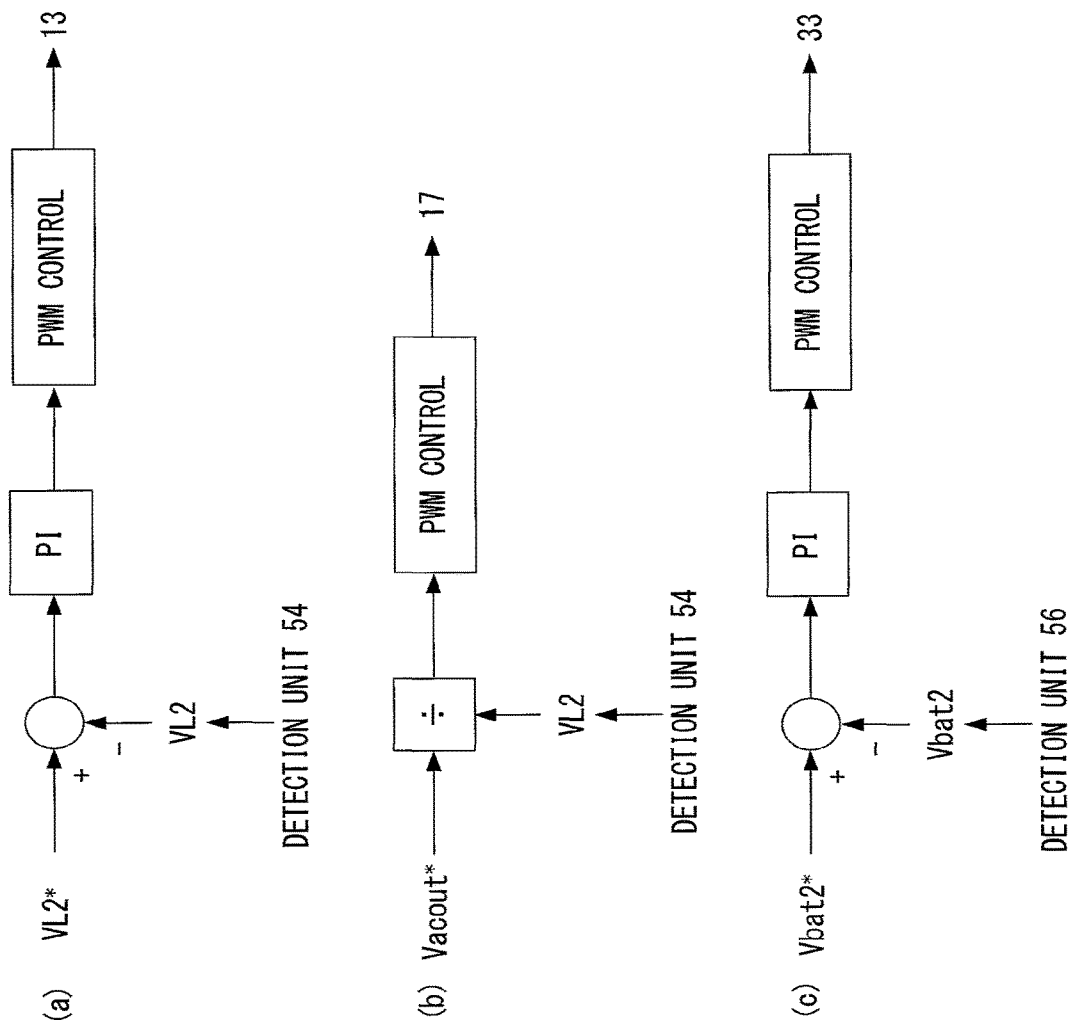
FIG. 8 is a block diagram of the control unit for realizing the power flows shown in FIG. 3 and FIG. 4.

FIG. 7 and FIG. 8 show the case of performing operation such that, while the charge power P2 for the first DC voltage source 11 is made constant, a sum of the charge power P2, the supply power P3 for the AC load connected to the load device connection end 21, and the charge power P4 for the second DC voltage source 34 is received from the AC power supply 1. In this case, for the AC/DC converter 2, based on a deviation between the voltage command value VL1* for the capacitor 3 and the voltage detection value VL1 from the voltage current detector 52, proportional integral control (PI control) is performed to obtain the AC power supply current command value Iacin*. Then, based on a deviation between the AC power supply current command value Iacin* and the current detection value Iacin from the voltage current detector 51, proportional control (P control) is performed, and then PWM control is performed, thereby controlling the voltage VL1 of the capacitor 3 and performing high power factor control for the AC power supply current Iacin (see FIG. 7(a)). In addition, the first switching circuit 4 performs PWM operation at a constant time ratio based on an arbitrary time ratio command value Duty*, thereby supplying AC power to the transformer 6 (see FIG. 7(b)).

For the second switching circuit 8, based on a deviation between the current command value Ibat1* for the first DC voltage source 11 and the current detection value Ibat1 from the voltage current detector 53, proportional control (P control) is performed, and then PWM control is performed, thereby charging the first DC voltage source 11 with constant current (see FIG. 7(c)).

The third switching circuit 13, the inverter 17, and the switching element 33 of the fourth switching circuit 30 are operated in the same manner as in FIG. 6(a) to FIG. 6(c) (see FIG. 8(a) to FIG. 8(c)).

Thus, in the controls shown in FIG. 7 and FIG. 8, operation is performed such that a sum of the charge power P2 for the first DC voltage source 11, the supply power P3 for the AC load connected to the load device connection end 21, and the charge power P4 for the second DC voltage source 34 is received from the AC power supply 1. In the controls in FIG. 5, FIG. 6, FIG. 7, and FIG. 8, the time ratio of the first switching circuit 4 may be varied based on a result of feedback of the voltage detection value VL1 from the voltage current detector 52.

Figure 9:
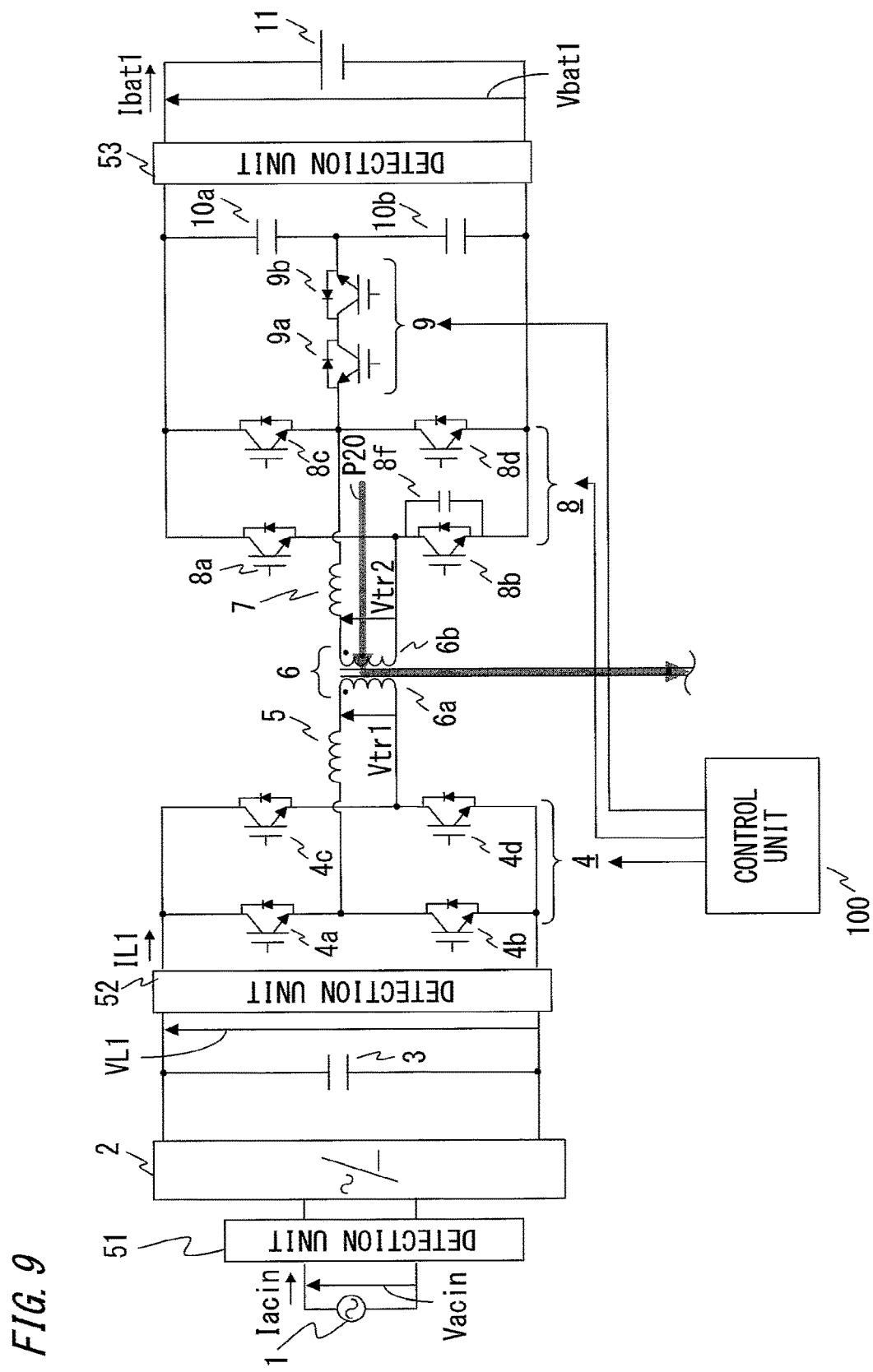
FIG. 9 is a diagram for explaining a power flow in the power conversion device according to embodiment 1 of the present invention.
Figure 10:
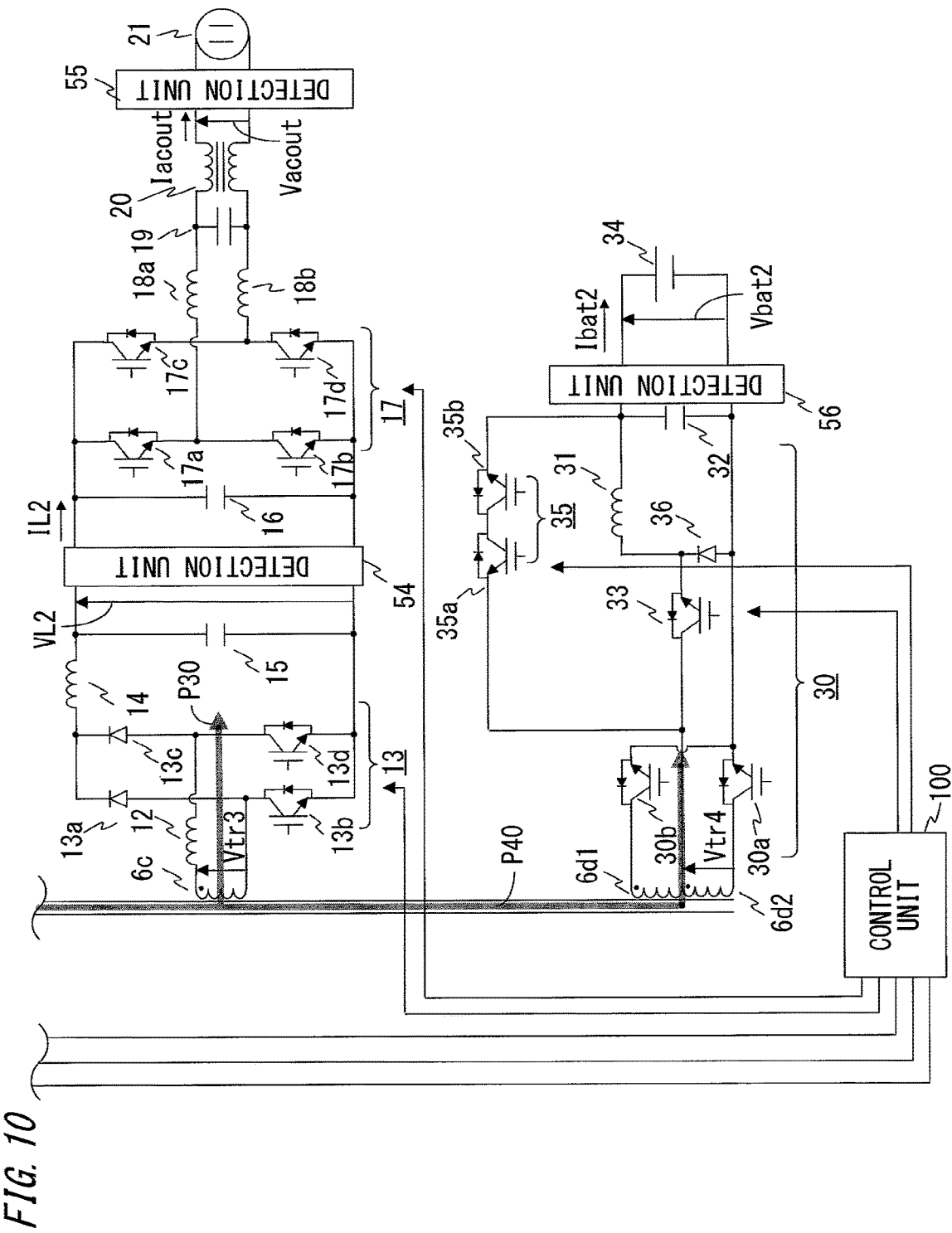
FIG. 10 is a diagram for explaining a power flow in the power conversion device according to embodiment 1 of the present invention.

As shown in FIG. 9 and FIG. 10, in the case where the AC power supply 1 is not connected and therefore the first DC voltage source 11 is used as a power supply source, discharge power P20 from the first DC voltage source 11 is distributed into supply power P30 for the AC load connected to the load device connection end 21, and charge power P40 for the second DC voltage source 34. Input power P10 from the AC power supply 1 at this time is zero.

Figure 11:
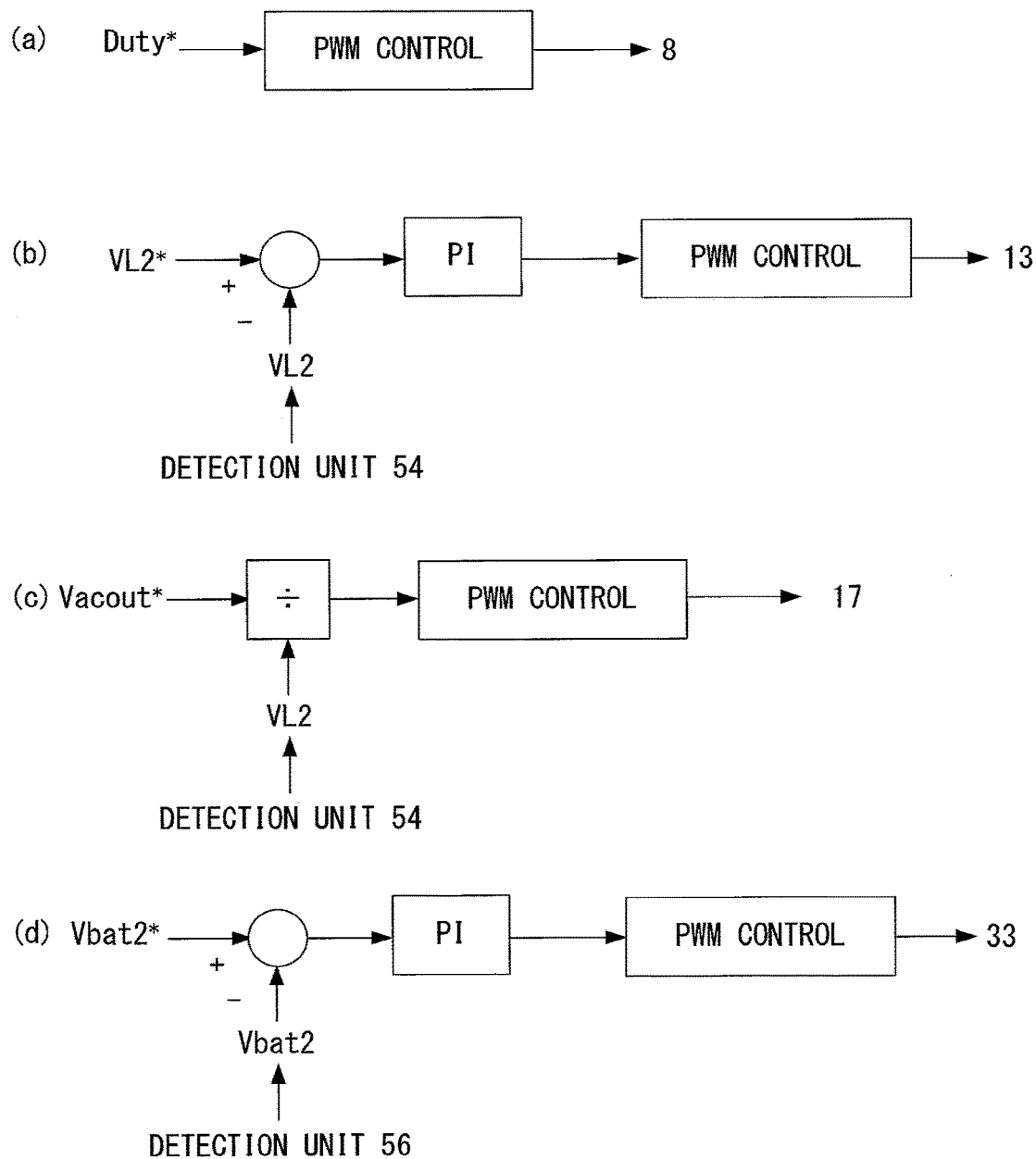
FIG. 11 is a block diagram of the control unit for realizing the power flows shown in FIG. 9 and FIG. 10.

FIG. 11 is a block diagram of the control unit 100 for realizing the power flows shown in FIG. 9 and FIG. 10.

FIG. 11 shows the case of discharging the first DC voltage source 11 without particularly considering the voltage VL1 of the capacitor 3. In this case, operations of the AC/DC converter 2 and the first switching circuit 4 are both stopped, and the second switching circuit 8 performs PWM operation at a constant time ratio based on an arbitrary time ratio command value Duty*, thereby discharging the first DC voltage source 11 (see FIG. 11(a)).

The third switching circuit 13, the inverter 17, and the switching element 33 of the fourth switching circuit 30 are operated in the same manner as in FIG. 6(a) to FIG. 6(c) (see FIG. 11(b) to FIG. 11(d)).

Figure 12:
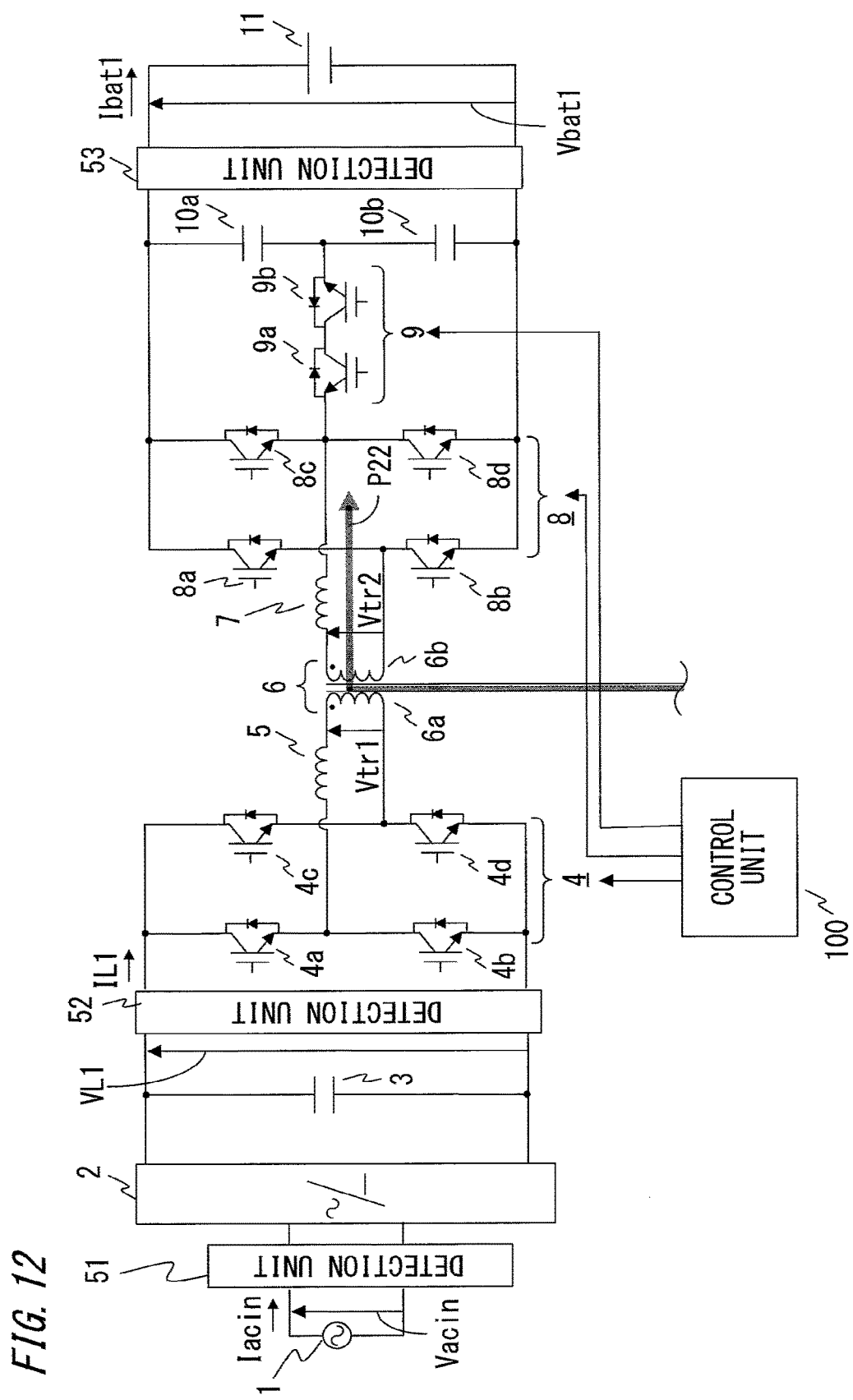
FIG. 12 is a diagram for explaining a power flow in the power conversion device according to embodiment 1 of the present invention.
Figure 13:
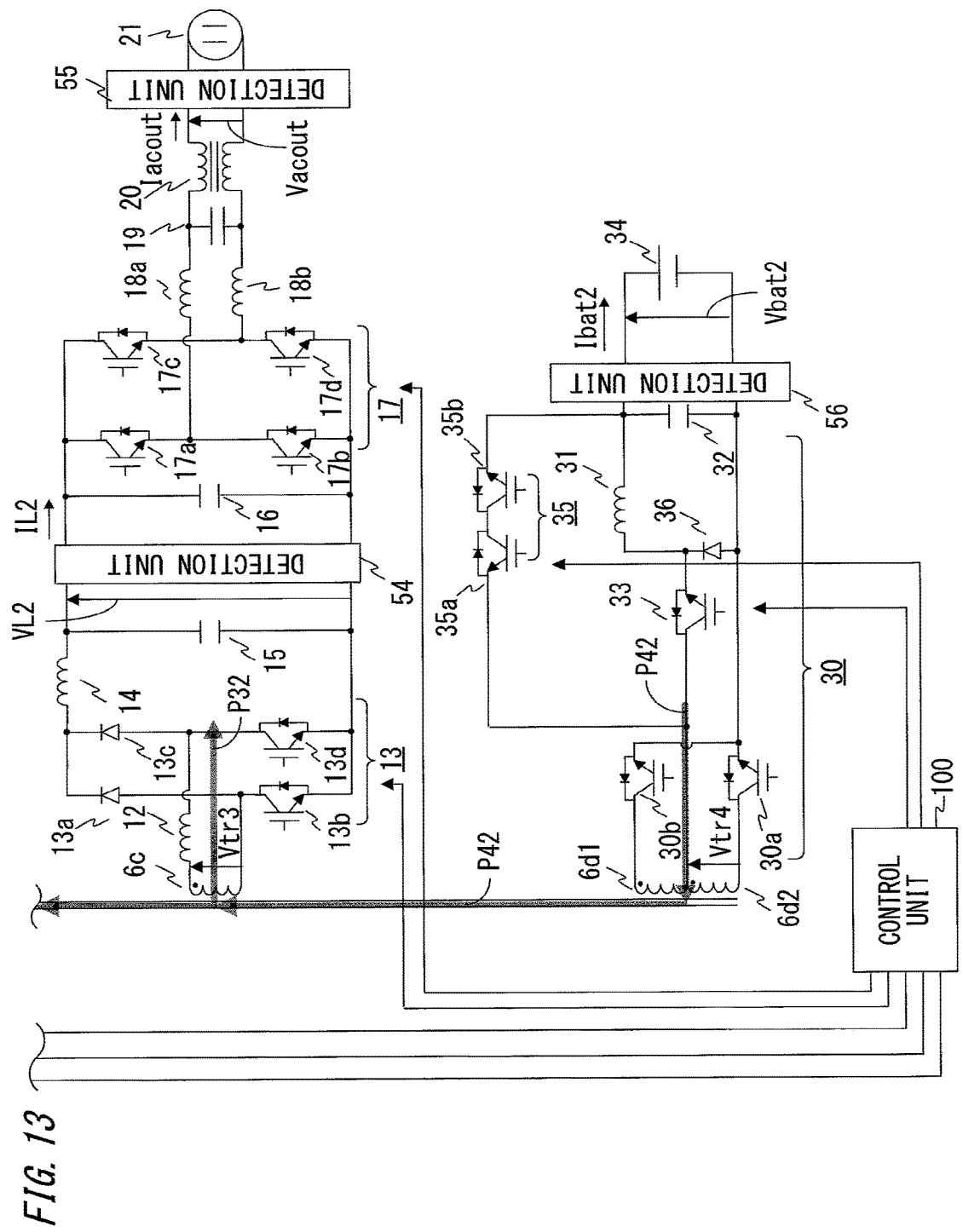
FIG. 13 is a diagram for explaining a power flow in the power conversion device according to embodiment 1 of the present invention.

As shown in FIG. 12 and FIG. 13, in the case where the AC power supply 1 is not connected and the charge amount of the first DC voltage source 11 is insufficient, the second DC voltage source 34 is used as a power supply source. In this case, discharge power P42 from the second DC voltage source 34 is distributed into charge power P22 for the first DC voltage source 11 and supply power P32 for the AC load connected to the load device connection end 21.

Figure 14:
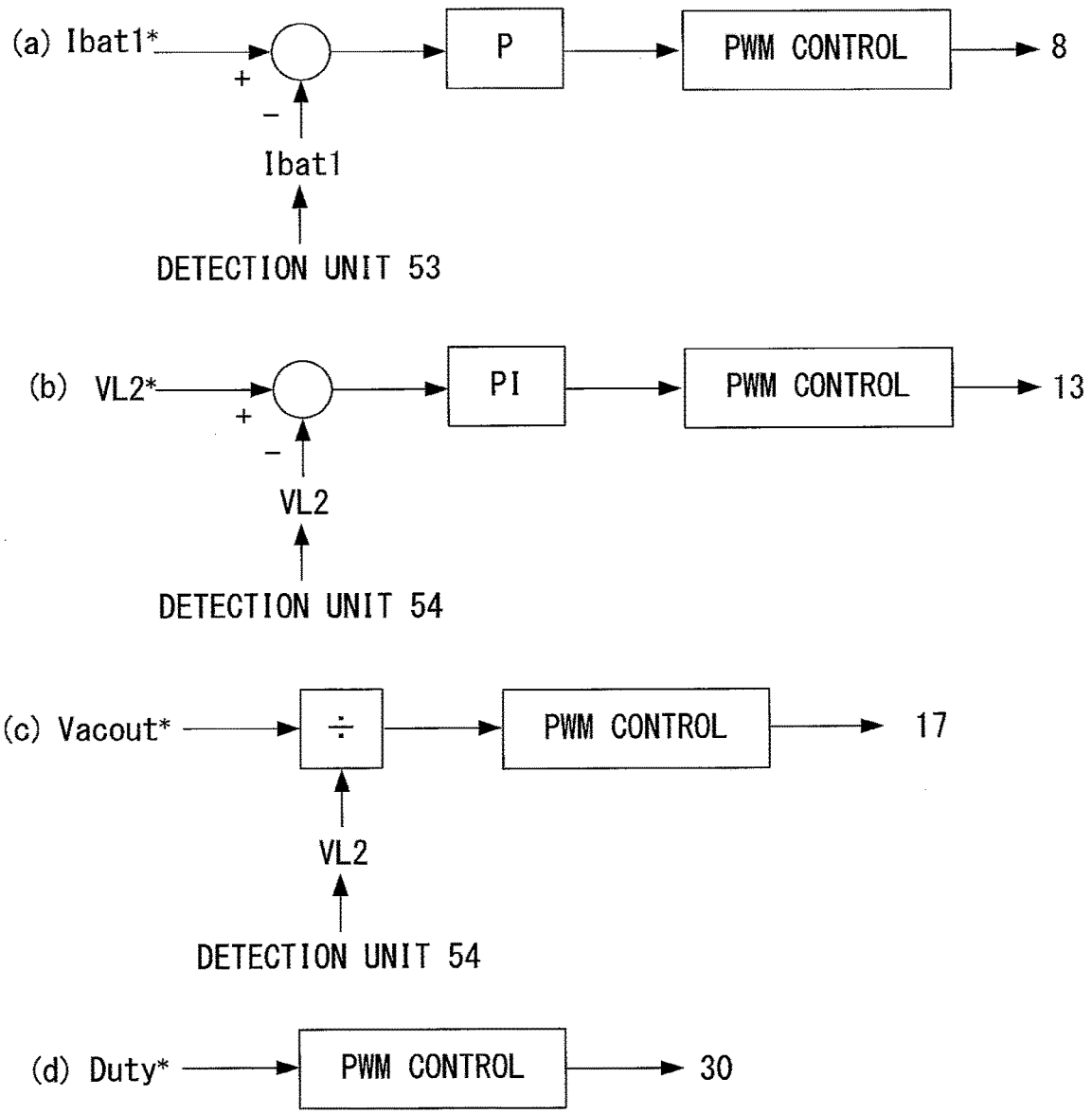
FIG. 14 is a block diagram of the control unit for realizing the power flows shown in FIG. 12 and FIG. 13.

FIG. 14 is a block diagram of the control unit 100 for realizing the power flows shown in FIG. 12 and FIG. 13.

FIG. 14 shows the case of discharging the second DC voltage source 34 without particularly considering the voltage VL1 of the capacitor 3. Therefore, operations of the AC/DC converter 2 and the first switching circuit 4 are both stopped, and the switch 35 at the stage preceding the second DC voltage source 34 is turned on, whereby the switching element 33 and the smoothing coil 31 are bypassed.

The switching elements 30a and 30b of the fourth switching circuit 30 perform PWM operation at a constant time ratio based on an arbitrary time ratio command value Duty*, thereby supplying AC power to the transformer 6 (see FIG. 14(d)). For the second switching circuit 8, based on a deviation between the current command value Ibat1* for the first DC voltage source 11 and the current detection value Ibat1 from the voltage current detector 53, proportional control (P control) is performed, and then PWM control is performed, thereby charging the first DC voltage source 11 with constant current (see FIG. 14(a)).

The third switching circuit 13 and the inverter 17 are operated in the same manner as in FIG. 6(b) and FIG. 6(c) (see FIG. 14(b) and FIG. 14(c)).

In the description of control operation of the control unit 100, the first DC voltage source 11 is controlled by constant current charging, and the second DC voltage source 34 is controlled by constant voltage charging. However, the charging methods for the first DC voltage source 11 and the second DC voltage source 34 are not limited to the above charging methods, but may be determined in accordance with the first and second DC voltage sources 11 and 34. For example, the first DC voltage source 11 may be charged with constant voltage, and the second DC voltage source 34 may be charged with constant current.

In the case of discharging the first DC voltage source 11, the switch 9 may be turned on, the two switching elements 8c and 8d on one arm may be turned off, and the two switching elements 8a and 8b on the other arm may be subjected to PWM control, to perform half-bridge operation, thereby discharging the first DC voltage source 11, or the four switching elements 8a to 8d may be subjected to PWM control to perform full-bridge operation, thereby discharging the first DC voltage source 11.

In the case where voltage or current for the first DC voltage source 11, the second DC voltage source 34, or the inverter 17 is not controlled or the case where power is not supplied from the first DC voltage source 11 or the second DC voltage source 34, each of the second switching circuit 8, the third switching circuit 13, and the switching element 33 of the fourth switching circuit 30 may be configured with a passive element for rectification, such as a diode. In the case where voltage or current for the second DC voltage source 34 is not controlled, the switching element 33, the switch 35, and the diode 36 are not needed. In the case where voltage of the smoothing capacitor 15 is controlled through the third switching circuit 13, the smoothing coil 14 may be omitted.

According to the present embodiment 1, it becomes possible to control the amount of power supplied from the AC power supply 1, the first DC voltage source 11, or the second DC voltage source 34 in accordance with power required by the first DC voltage source 11, the second DC voltage source 34, or the AC load connected to the load device connection end 21 (hereinafter, these are collectively referred to simply as loads), via the transformer 6.

That is, in the case of using only the AC power supply 1 as a power supply source, output voltage of the AC/DC converter 2 is controlled through the AC/DC converter 2, whereby a sum of the load powers can be supplied from the AC power supply 1. In addition, the voltage VL1 of the capacitor 3 on the output side of the AC/DC converter 2 is controlled by one of the switching circuits 8, 13, and 30 provided between the transformer 6 and their respective loads, thereby adjusting power supplied to the load on the subsequent side of each switching circuit 8, 13, 30 that controls the voltage VL1 on the output side of the AC/DC converter 2. Thus, power supplied from the AC power supply 1 can be made constant.

In the case of using only the first DC voltage source 11 or the second DC voltage source 34 as a power supply source, the second switching circuit 8 or the fourth switching circuit 30 is operated with an arbitrary ON time (duty), whereby power can be supplied.

In the power conversion device shown in FIG. 1 and FIG. 2, if the turns ratio of the transformer 6 is adjusted so that induced voltage occurring on the second winding 6b or the fourth windings 6d1 and 6d2 of the transformer 6 is smaller than charge voltage of the first DC voltage source 11 or the second DC voltage source 34, supply of power to the first DC voltage source 11 or the second DC voltage source 34 can be stopped by stopping operation of the second switching circuit 8 or the fourth switching circuit 30.

For example, the number of turns of the first winding 6a and the number of turns of the second winding 6b are adjusted to set the turns ratio so that the voltage Vtr2 of the second winding 6b of the transformer 6 is lower than the voltage Vbat1 of the first DC voltage source 11. That is, the turns ratio is set so as to satisfy the following expression.

$$Vtr2 = \{(n2/n1) \times Vtr1\} < Vbat1$$

In this state, since the voltage Vtr2 of the second winding 6b of the transformer 6 is lower than the voltage Vbat1 of the first DC voltage source 11, the first DC voltage source 11 is not charged.

Therefore, in order to charge the first DC voltage source 11, the second switching circuit 8 is operated as a step-up chopper. That is, first, the switch 9 is turned off, and then the switching element 8d of the second switching circuit 8 is turned on, thereby flowing current through the step-up coil 7 to store energy. Next, the switching element 8d is turned off and the switching element 8c is turned on, whereby the energy stored in the step-up coil 7 is charged into the first DC voltage source 11 via the switching element 8c. The charge amount can be controlled using the ON/OFF ratio of the switching element 8d.

As described above, the turns ratio between the first winding 6a and the second winding 6b of the transformer 6 is set so that the voltage Vtr2 of the second winding 6b of the transformer 6 is lower than the voltage Vbat1 of the first DC voltage source 11, and in this state, the second switching circuit 8 is caused to perform step-up operation and the step-up ratio is controlled, whereby the charge amount for the first DC voltage source 11 can be controlled. In addition, by stopping operation of the second switching circuit 8, the charging can be stopped. Since the charging can be stopped, for example, in the case where the first DC voltage source 11 is a battery, it is possible to prevent overcharge by stopping the charging in a full-charge state.

As described above, the power conversion device according to embodiment 1 can perform power distribution control of input power to multiple outputs by combining the control on the power supply side with the control on the load side, and as necessary, can arbitrarily stop operation of charging the first DC voltage source 11 or the second DC voltage source 34, while supplying power to another load.

Figure 15:
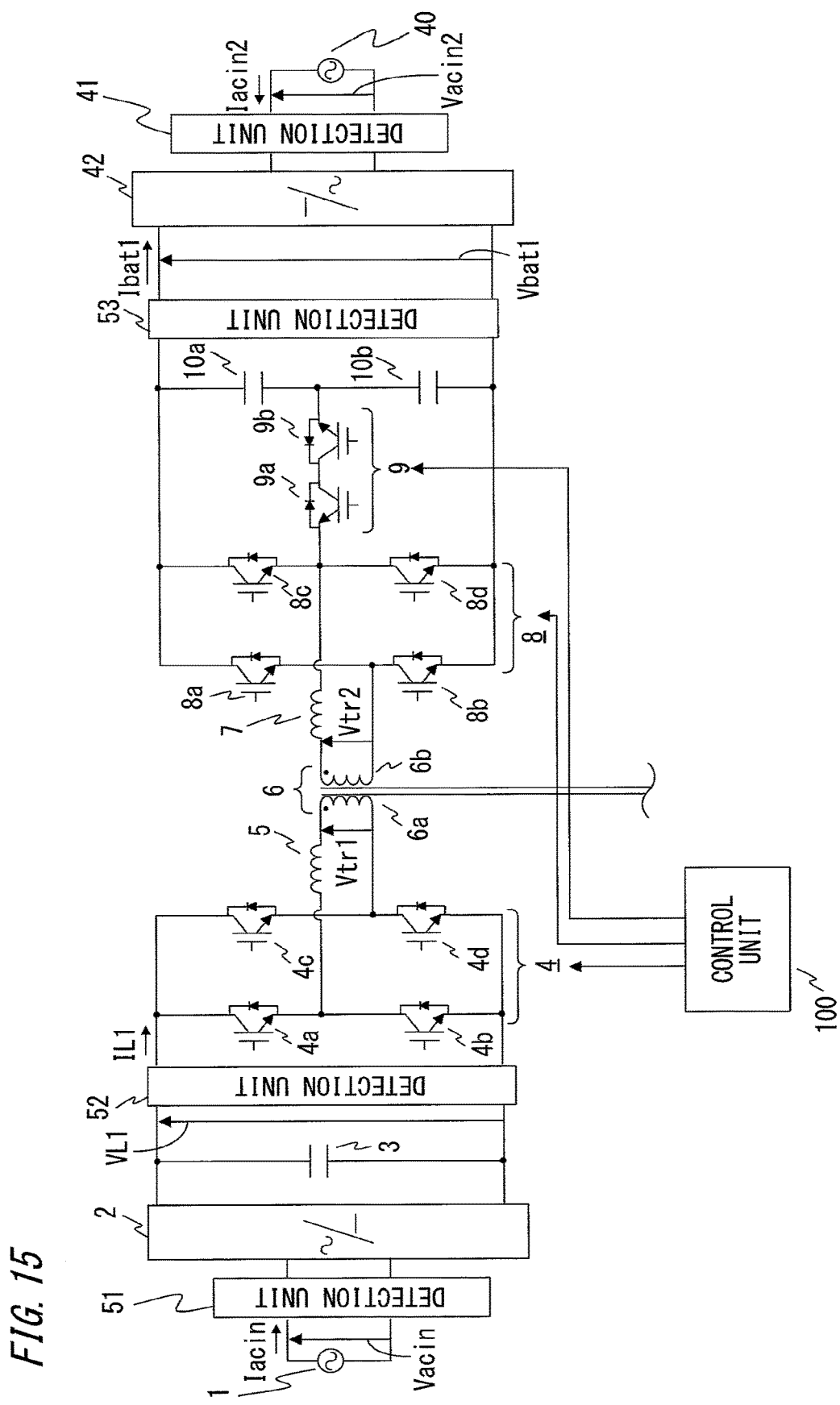
FIG. 15 is a circuit configuration diagram of another power conversion device according to embodiment 1 of the present invention.
Figure 16:
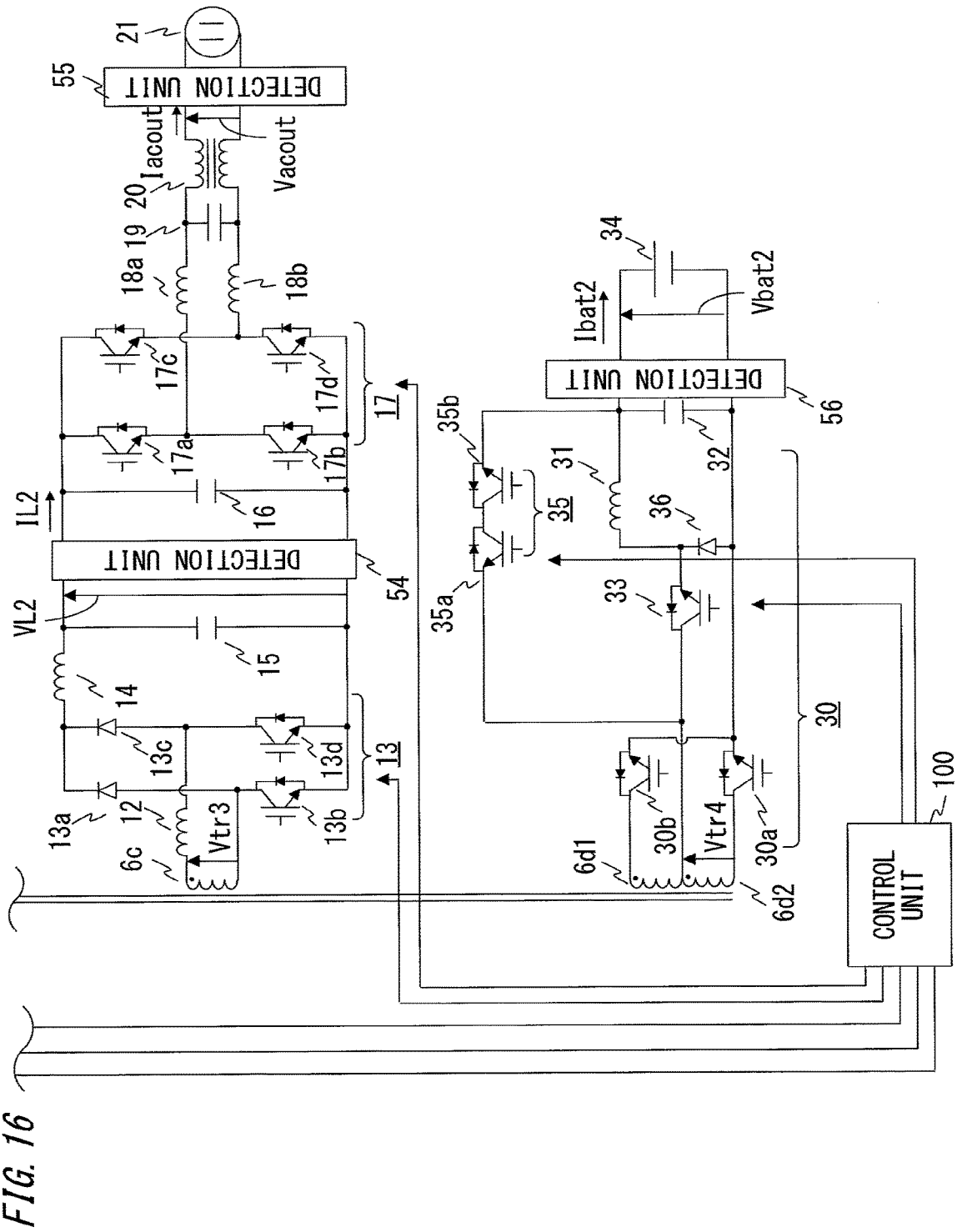
FIG. 16 is a circuit configuration diagram of the other power conversion device according to embodiment 1 of the present invention.

In the circuit configuration diagrams of the power conversion device shown in FIG. 1 and FIG. 2, the first DC voltage source 11 or the second DC voltage source 34 may be replaced with an AC/DC converter capable of bidirectional power conversion and an AC power supply. FIG. 15 and FIG. 16 show circuit configuration diagrams of a power conversion device obtained by replacing the first DC voltage source in the power conversion device shown in FIG. 1 and FIG. 2 with such an AC/DC converter and an AC power supply. That is, in FIG. 15 and FIG. 16, the first DC voltage source 11 in FIG. 1 and FIG. 2 is replaced with an AC power supply 40, a voltage current detector 41 for the AC power supply 40, and an AC/DC converter 42 capable of bidirectional power conversion. In the case where the AC/DC converter 42 capable of bidirectional power conversion regenerates power to the AC power supply 40, the same operation as the above operation in which the first DC voltage source 11 is charged in the circuit configuration in FIG. 1 and FIG. 2 is performed. In the case where the AC/DC converter 42 capable of bidirectional power conversion receives power from the AC power supply 40, the same operation as the above operation in which the first DC voltage source 11 is discharged in the circuit configuration in FIG. 1 and FIG. 2 is performed. The operations in the case where the second DC voltage source 34 in the circuit configuration in FIG. 1 and FIG. 2 is replaced with an AC power supply, a voltage current detector for the AC power supply, and an AC/DC converter capable of bidirectional power conversion are also performed in the same manner as described above.

Embodiment 2

Figure 17:
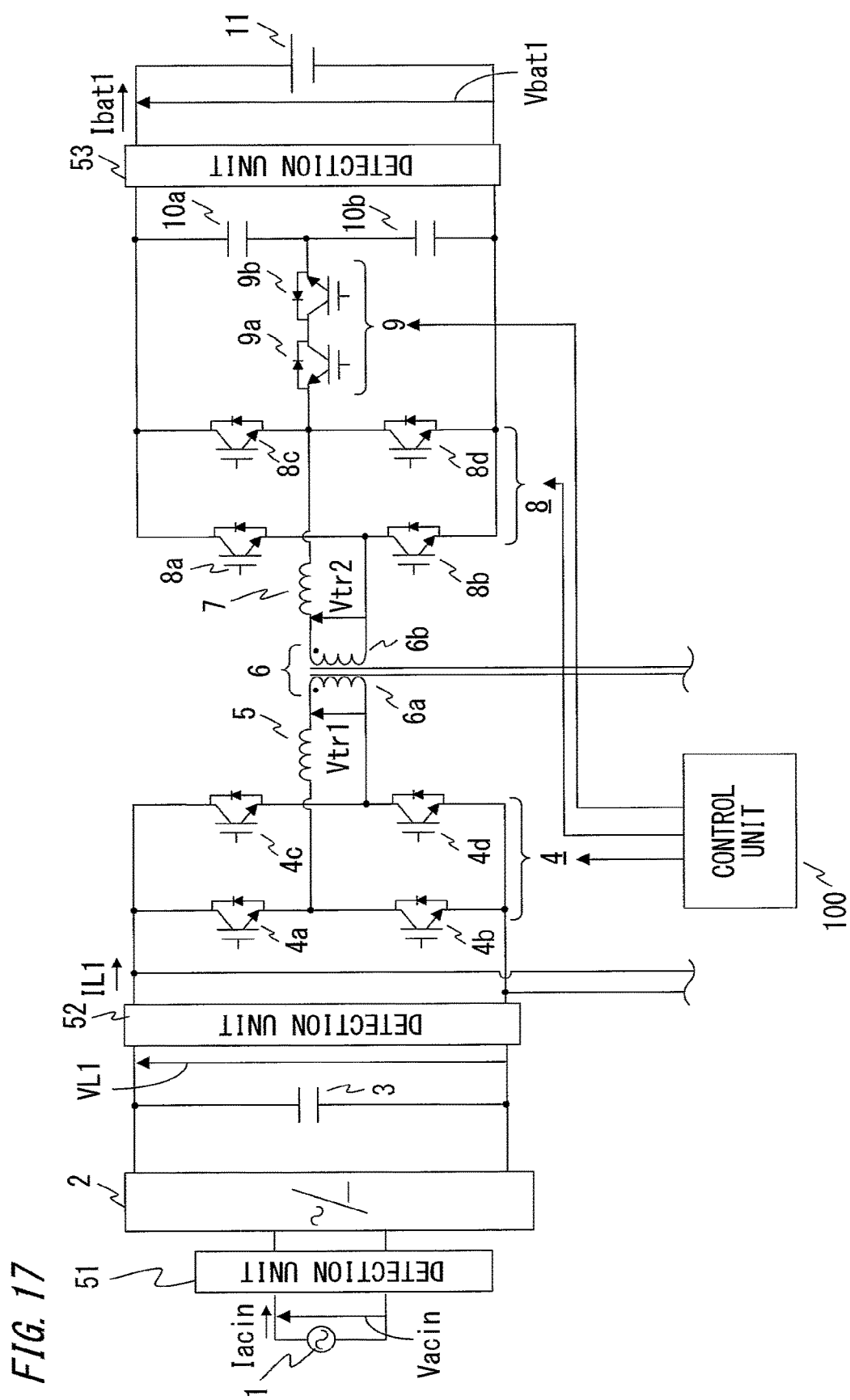
FIG. 17 is a circuit configuration diagram of a power conversion device according to embodiment 2 of the present invention.
Figure 18:
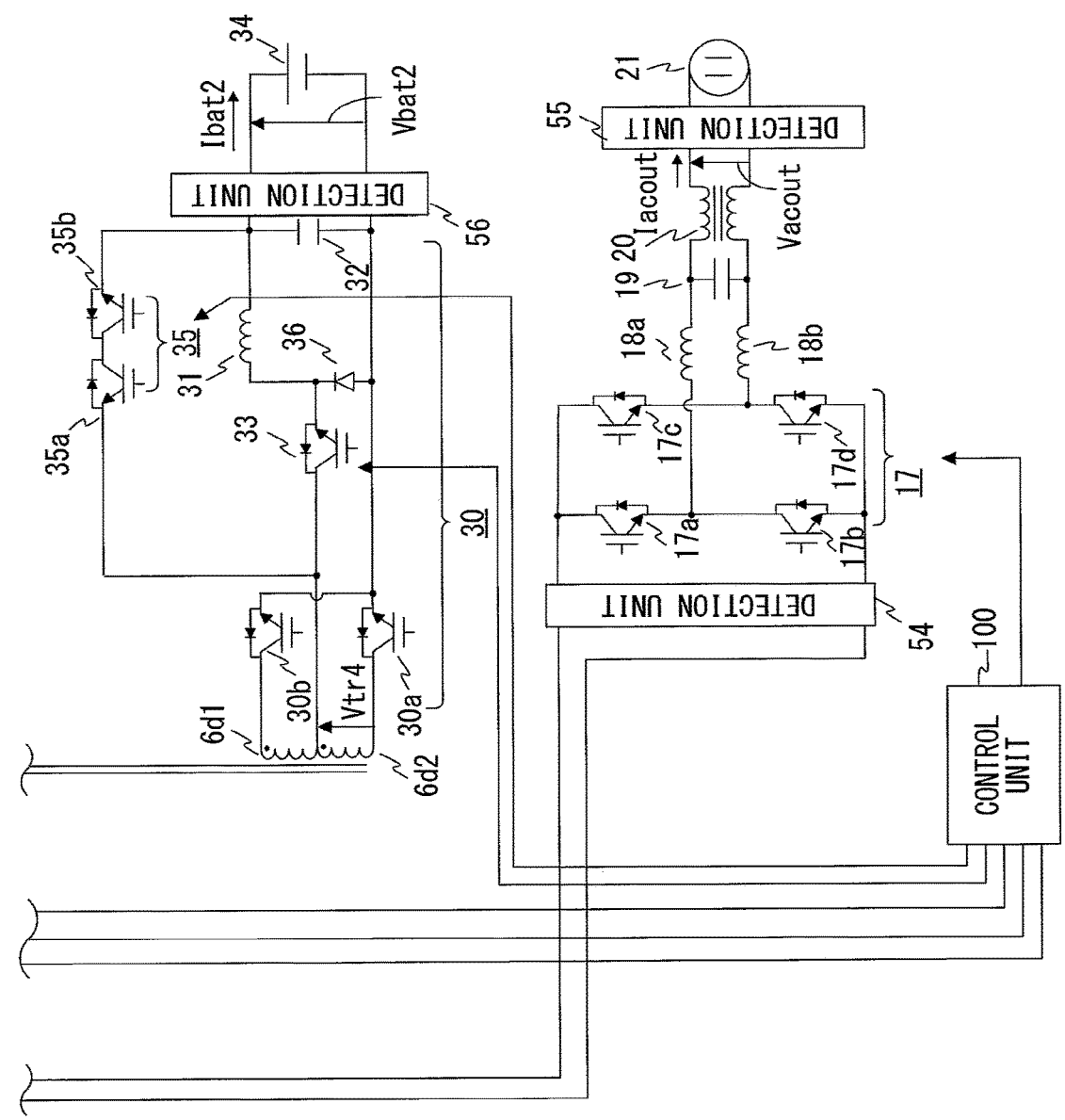
FIG. 18 is a circuit configuration diagram of the power conversion device according to embodiment 2 of the present invention.

FIG. 17 and FIG. 18 are circuit configuration diagrams of a power conversion device according to embodiment 2 of the present invention. The components that correspond to or are the same as those in embodiment 1 shown in FIG. 1 and FIG. 2 are denoted by the same reference characters.

A configuration feature of embodiment 2 is that the DC input end of the inverter 17 composed of the four switching elements 17a to 17dc is connected to the output end side of the AC/DC converter 2, in parallel with the first switching circuit 4 via the voltage current detector 54. To the AC output end of the inverter 17, the smoothing coils 18a and 18b, the smoothing capacitor 19, the common mode choke coil 20, the voltage current detector 55, and the load device connection end 21 are connected in this order. At the load device connection end 21, the AC power supply Vacout is generated which is a power supply for the AC load (not shown).

The other configuration is basically the same as in embodiment 1. Therefore, the corresponding components are denoted by the same reference characters and the detailed description thereof is omitted. The operations of the first to fourth switching circuits 4, 8, 13, and 30, the inverter 17, and the like are also basically the same as in embodiment 1, and therefore the detailed description thereof is omitted here.

Next, a power flow in the power conversion device according to embodiment 1 of the present invention will be described with reference to FIG. 19 to FIG. 28.

Figure 19:
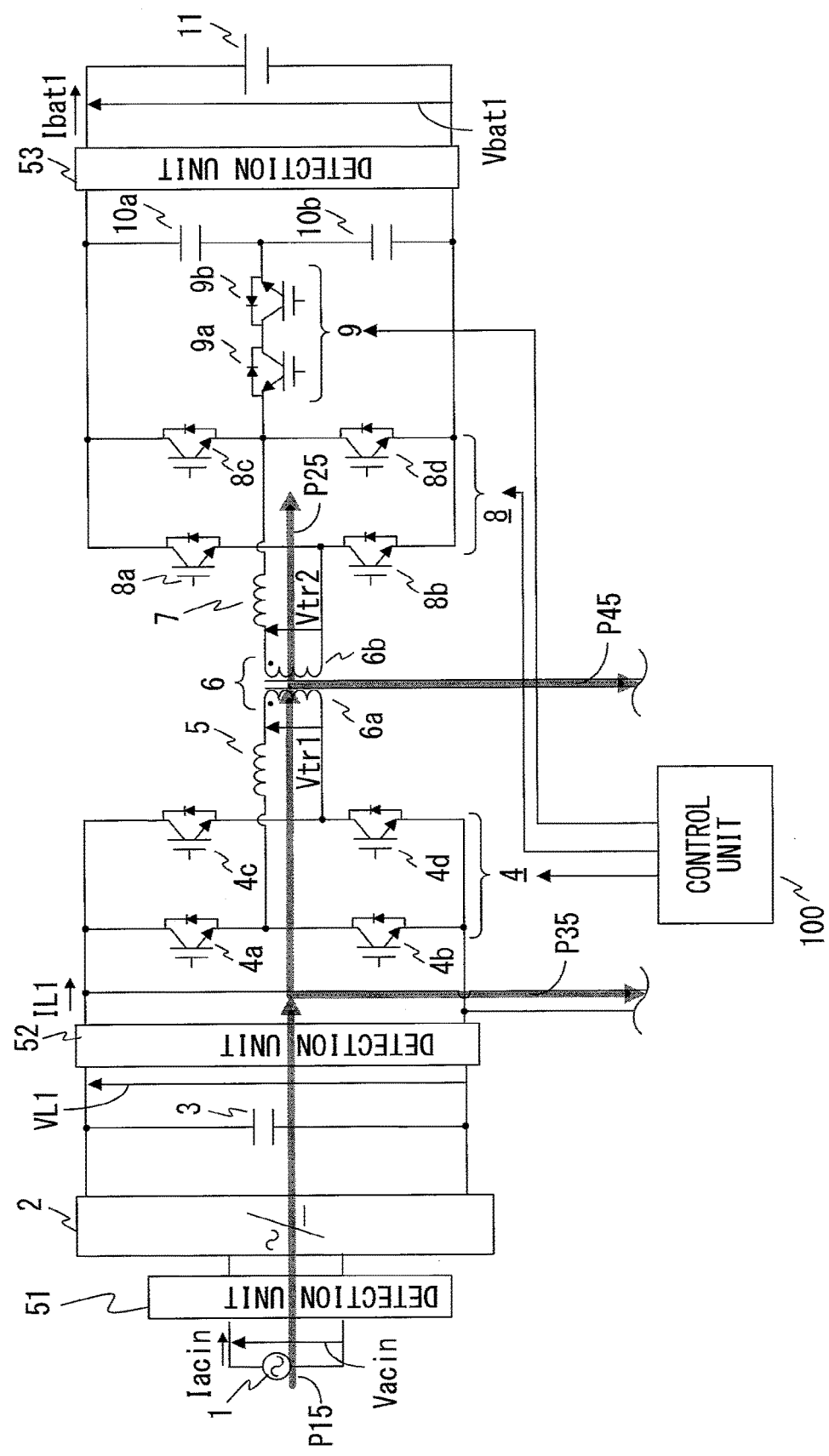
FIG. 19 is a diagram for explaining a power flow in the power conversion device according to embodiment 2 of the present invention.
Figure 20:
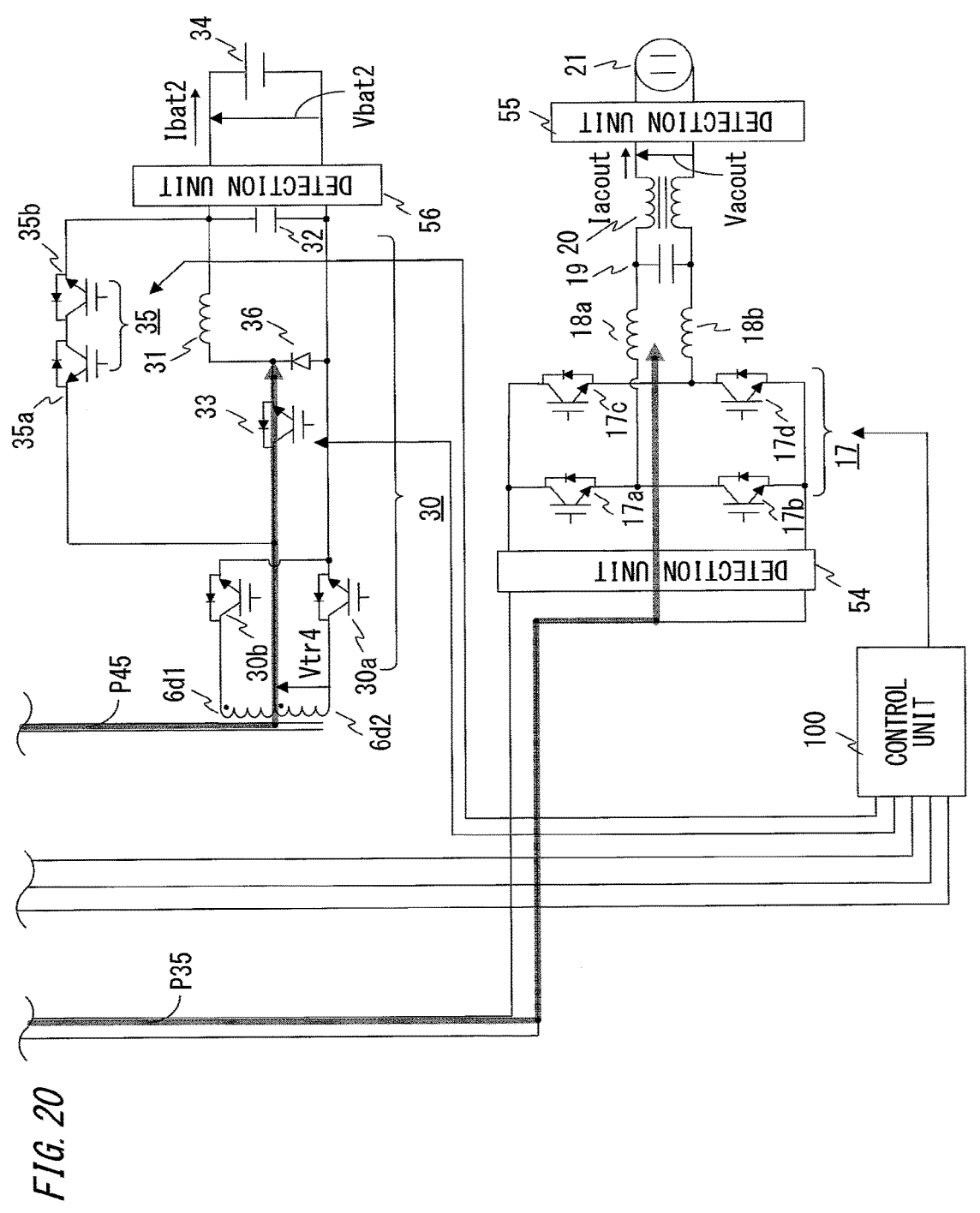

As shown in FIG. 19 and FIG. 20, in the case where the AC power supply 1 is connected and is used as a power supply source, input power P15 from the AC power supply 1 is distributed into charge power P25 for the first DC voltage source 11, supply power P35 for the AC load connected to the load device connection end 21, and charge power P45 for the second DC voltage source 34.

Figure 21:
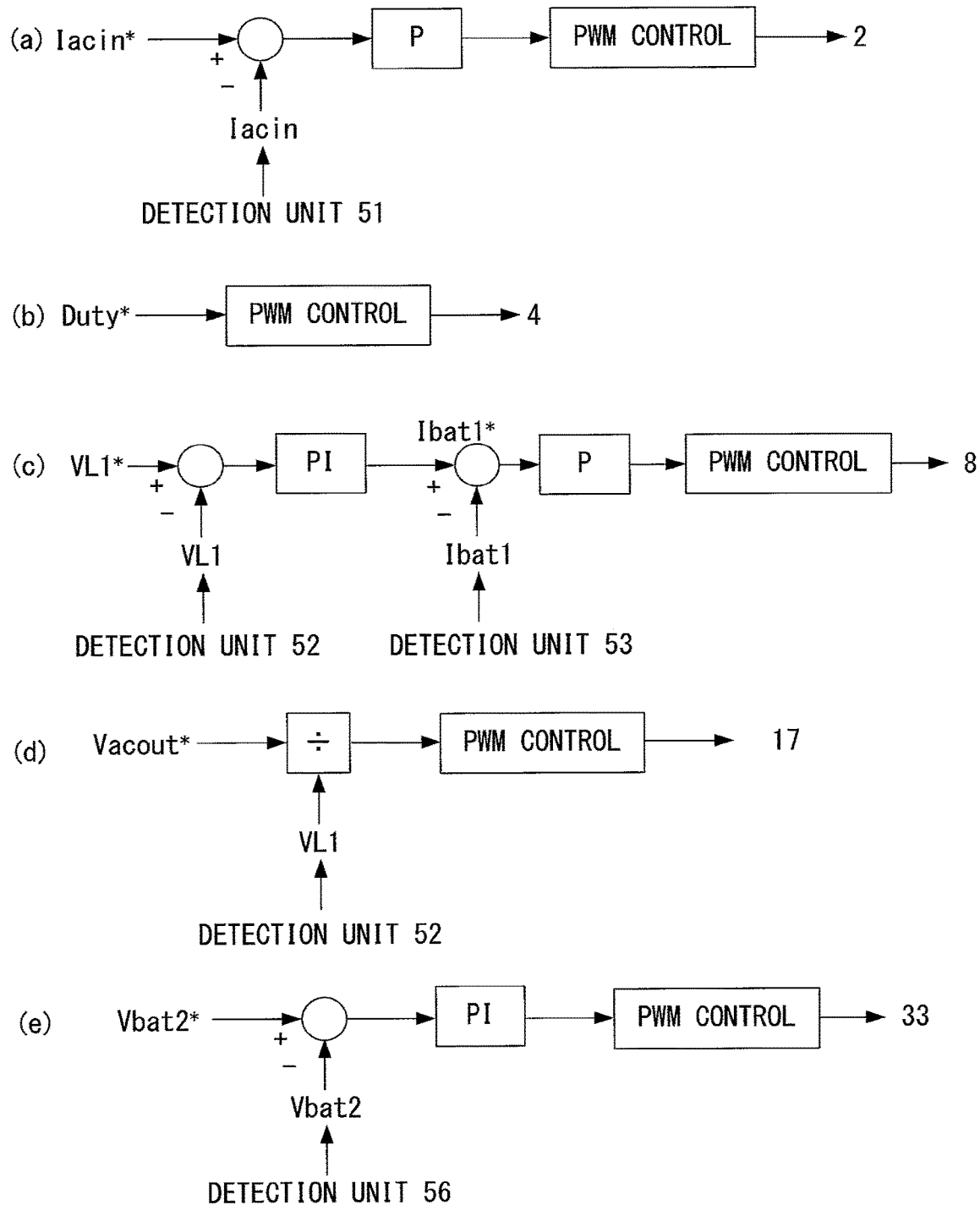
FIG. 21 is a block diagram of a control unit for realizing the power flows shown in FIG. 19 and FIG. 20.
Figure 22:
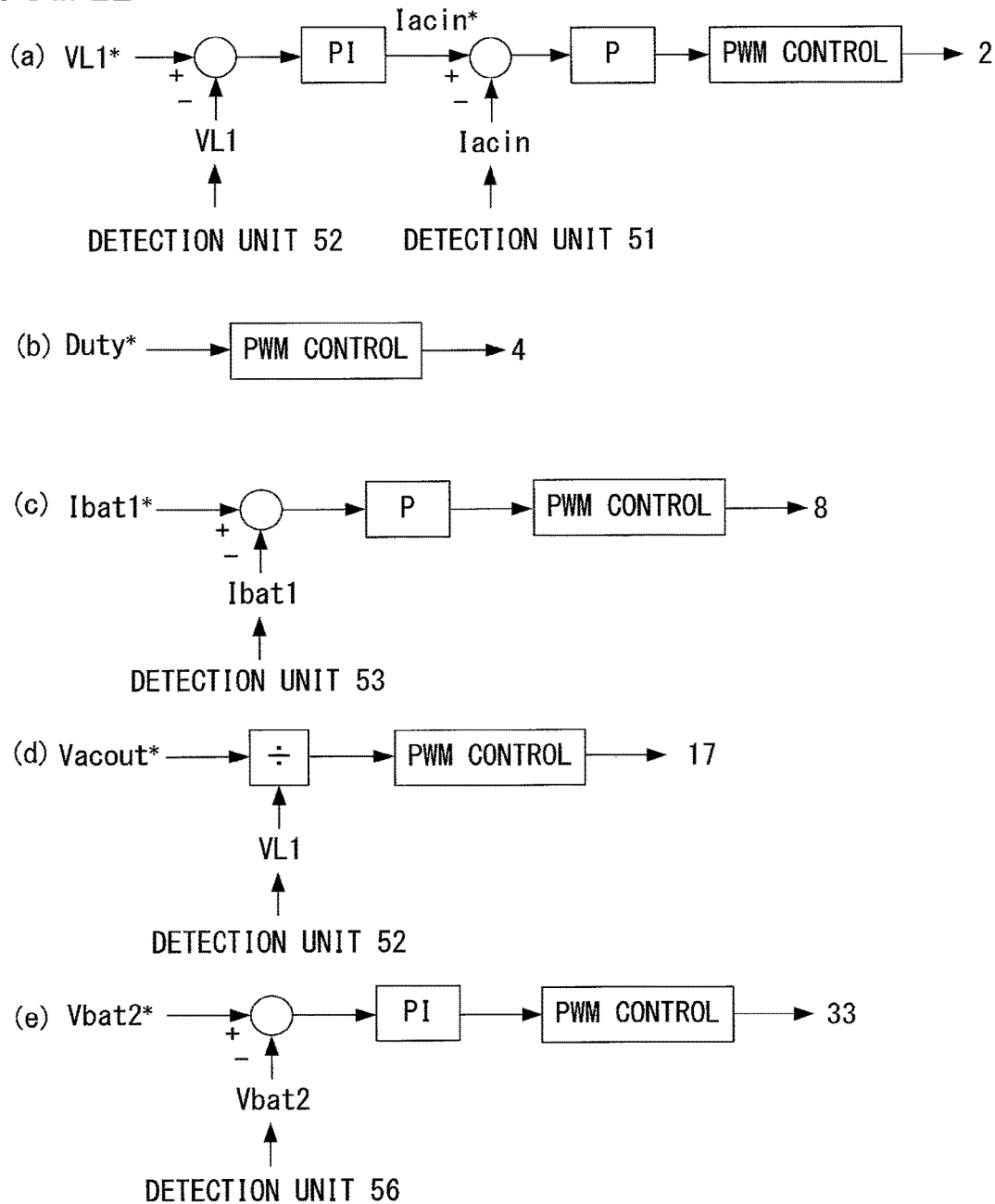
FIG. 22 is a block diagram of the control unit for realizing the power flows shown in FIG. 19 and FIG. 20.

FIG. 21 and FIG. 22 are block diagrams of the control unit 100 for realizing the power flows in the power conversion device shown in FIG. 19 and FIG. 20.

FIG. 21 shows the case of performing operation so as to prioritize the supply power P35 for the AC load connected to the load device connection end 21 and the charge power P45 for the second DC voltage source 34 and supply the remaining power as the charge power P25 for the first DC voltage source 11. In this case, the AC/DC converter 2 supplies power at constant current. That is, for the AC/DC converter 2, based on a deviation between a current command value Iacin* for the AC power supply 1 and a current detection value Iacin from the voltage current detector 51, proportional control (P control) is performed, and then PWM control is performed, thereby supplying power at constant current to the capacitor 3 and at the same time, controlling the AC current at a high power factor (see FIG. 21(a)). At this time, the current command value Iacin* for the AC power supply 1 may be arbitrarily set. The first switching circuit 4 performs PWM operation at a constant time ratio based on an arbitrary time ratio command value Duty*, thereby supplying AC power to the transformer 6 (see FIG. 21(b)).

For the second switching circuit 8, based on a deviation between a voltage command value VL1* for the capacitor 3 and the voltage detection value VL1 from the voltage current detector 52, proportional integral control (PI control) is performed to obtain a current command value Ibat1* for the first DC voltage source 11. Then, based on a deviation between the current command value Ibat1* and the current detection value Ibat1 from the voltage current detector 53, proportional control (P control) is performed, and then PWM control is performed, thereby performing charge current control for the first DC voltage source 11 (see FIG. 21(c)).

For the inverter 17, using a quotient between a command value Vacout* for the output AC voltage and the voltage detection value VL1 from the voltage current detector 52 as a modulation factor for a sinewave inverter, PWM control is performed, thereby outputting the AC voltage Vacout to the load device connection end 21 (see FIG. 21(d)).

For the switching element 33 composing the fourth switching circuit 30, based on a deviation between a voltage command value Vbat2* for the second DC voltage source 34 and the voltage detection value Vbat2 from the voltage current detector 56, proportional integral control (PI control) is performed, and then PWM control is performed, thereby performing charge voltage control for the second DC voltage source 34 (see FIG. 21(e)).

Thus, in the controls shown in FIG. 21, operation is performed such that constant input power P15 is received from the AC power supply 1 to output the supply power P35 for the AC load connected to the load device connection end 21 and the charge power P45 for the second DC voltage source 34, and the remaining power is supplied as the charge power P25 for the first DC voltage source 11.

The switching element 33 of the fourth switching circuit 30 may be operated so as to make the voltage VL1 of the capacitor 3 constant, and the second switching circuit 8 may be controlled so as to make voltage or current of the first DC voltage source 11 constant, whereby constant input power P15 may be received from the AC power supply 1 to output the supply power P35 for the AC load connected to the load device connection end 21 and the charge power P25 for the first DC voltage source 11, and the remaining power may be supplied to the second DC voltage source 34.

FIG. 22 shows the case of performing operation such that, while the charge power P25 for the first DC voltage source 11 is made constant, a sum of the charge power P25, the supply power P35 for the AC load connected to the load device connection end 21, and the charge power P45 for the second DC voltage source 34 is received from the AC power supply 1. In this case, for the AC/DC converter 2, based on a deviation between the voltage command value VL1* for the capacitor 3 and the voltage detection value VL1 from the voltage current detector 52, proportional integral control (PI control) is performed to obtain the AC power supply current command value Iacin*. Then, based on a deviation between the AC power supply current command value Iacin* and the current detection value Iacin from the voltage current detector 51, proportional control (P control) is performed, and then PWM control is performed, thereby controlling the voltage VL of the capacitor 3 and performing high power factor control for the AC power supply current Iacin (see FIG. 22(a)). In addition, the first switching circuit 4 performs PWM operation at a constant time ratio based on an arbitrary time ratio command value Duty*, thereby supplying AC power to the transformer 6 (see FIG. 22(b)).

For the second switching circuit 8, based on a deviation between the current command value Ibat1* for the first DC voltage source 11 and the current detection value Ibat1 from the voltage current detector 53, proportional control (P control) is performed, and then PWM control is performed, thereby charging the first DC voltage source 11 with constant current (see FIG. 22(c)).

The inverter 17 and the switching element 33 of the fourth switching circuit 30 are operated in the same manner as in FIG. 21(d) and FIG. 21(e) (see FIG. 22(d) and FIG. 22(e)).

Thus, in the controls shown in FIG. 22, operation is performed such that a sum of the charge power P25 for the first DC voltage source 11, the supply power P35 for the AC load connected to the load device connection end 21, and the charge power P45 for the second DC voltage source 34 is received from the AC power supply 1. In the controls in FIG. 21 and FIG. 22, the time ratio of the first switching circuit 4 may be varied based on a result of feedback of the voltage detection value VL1 from the voltage current detector 52.

Figure 23:
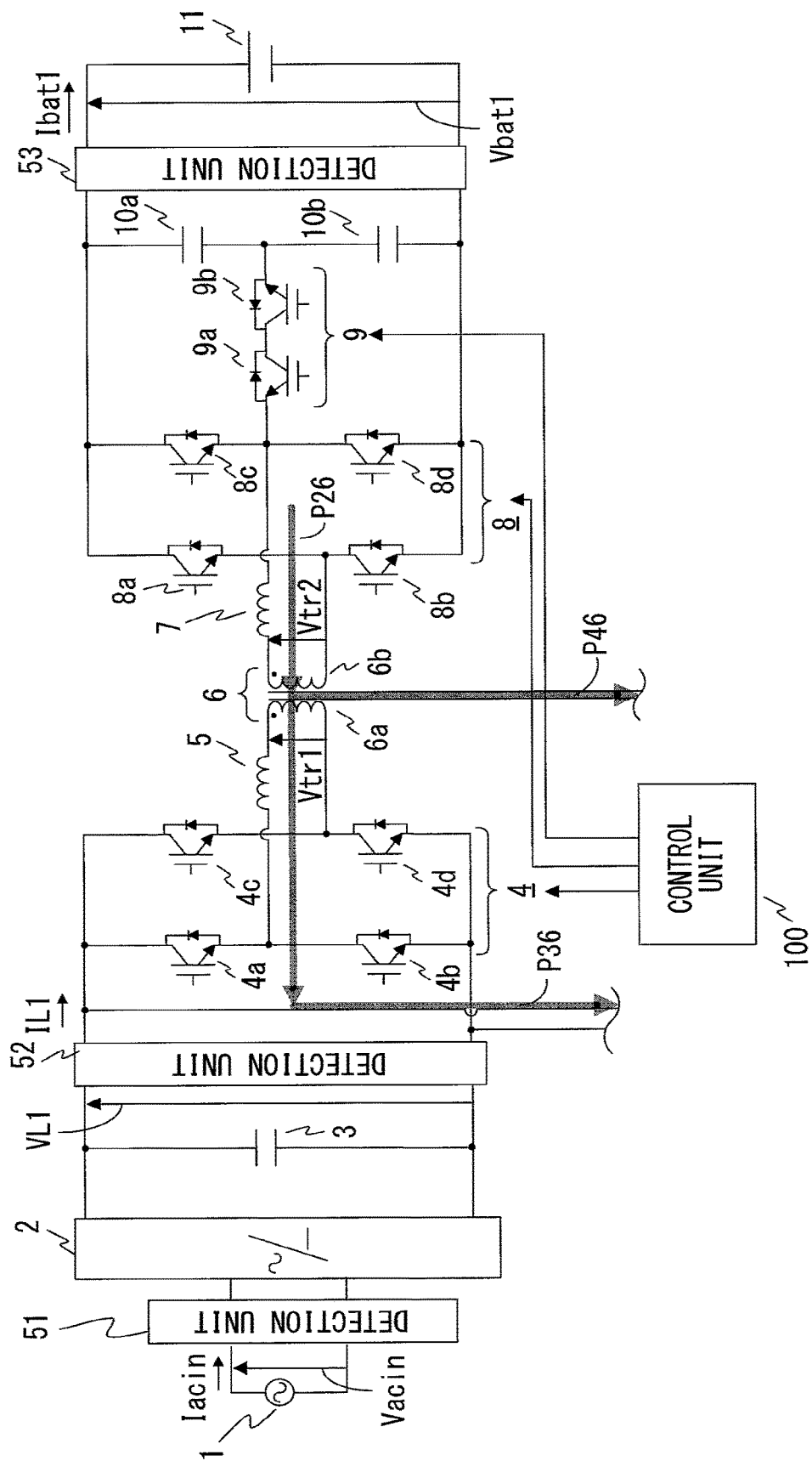
FIG. 23 is a diagram for explaining a power flow in the power conversion device according to embodiment 2 of the present invention.
Figure 24:
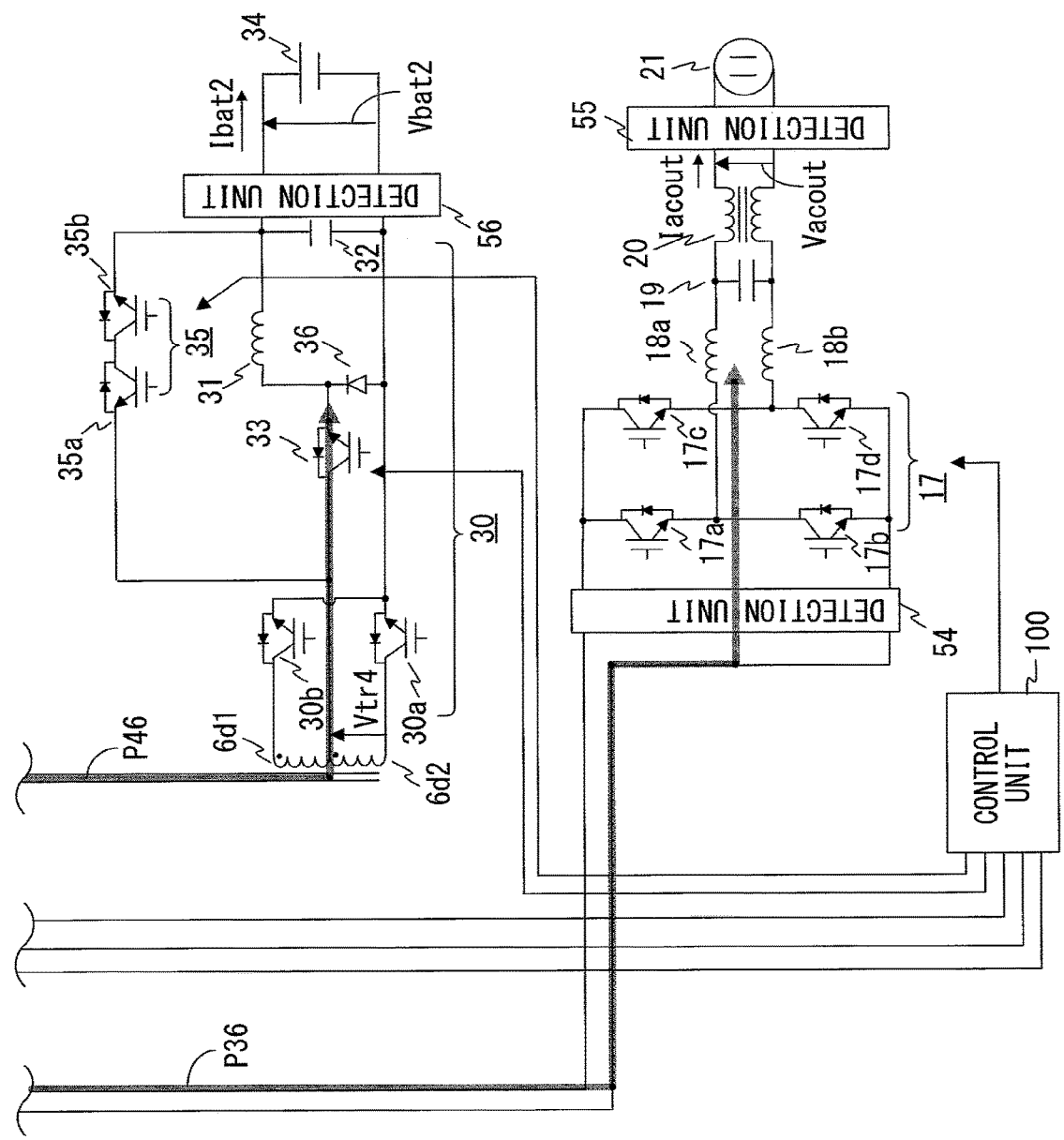
FIG. 24 is a diagram for explaining a power flow in the power conversion device according to embodiment 2 of the present invention.

As shown in FIG. 23 and FIG. 24, in the case where the AC power supply 1 is not connected and therefore the first DC voltage source 11 is used as a power supply source, discharge power P26 from the first DC voltage source 11 is distributed into supply power P36 for the AC load connected to the load device connection end 21, and charge power P46 for the second DC voltage source 34. Input power P16 from the AC power supply 1 at this time is zero.

Figure 25:
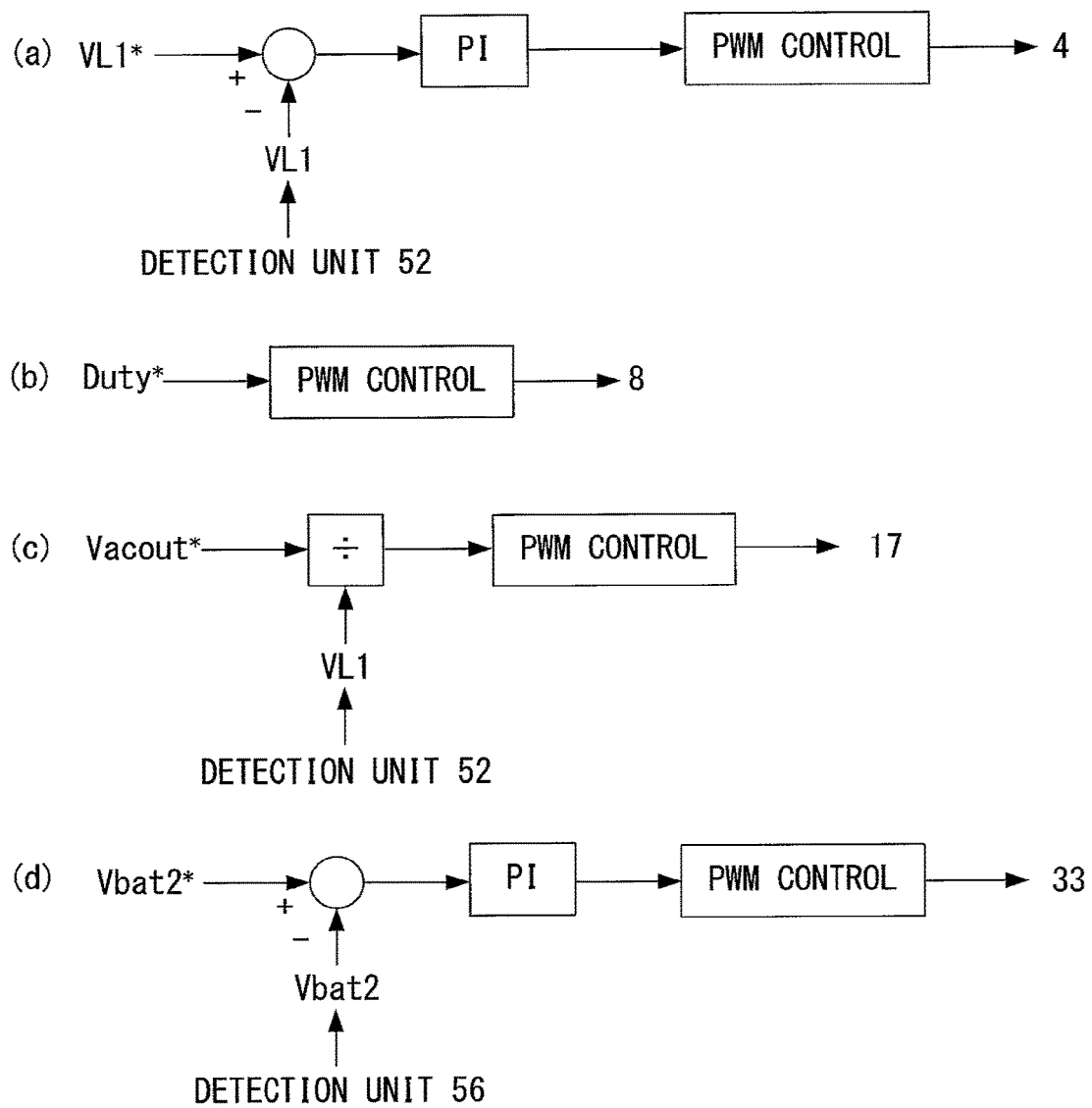
FIG. 25 is a block diagram of the control unit for realizing the power flows shown in FIG. 23 and FIG. 24.

FIG. 25 is a block diagram of the control unit 100 for realizing the power flows shown in FIG. 23 and FIG. 24.

Here, operation of the AC/DC converter 2 is stopped, and the second switching circuit 8 performs PWM operation at a fixed time ratio based on an arbitrary time ratio command value Duty*, thereby discharging the first DC voltage source 11 (see FIG. 25(b)). For the first switching circuit 4, based on a deviation between the voltage command value VL1* for the capacitor 3 and the voltage detection value VL1 from the voltage current detector 52, proportional integral control (PI control) is performed, and then PWM control is performed, thereby controlling the voltage VL1 of the capacitor 3 to be constant (see FIG. 25(a)).

The inverter 17 and the switching element 33 of the fourth switching circuit 30 are operated in the same manner as in FIG. 21(d) and FIG. 21(e) (see FIG. 25(c) and FIG. 25(d)).

Figure 26:
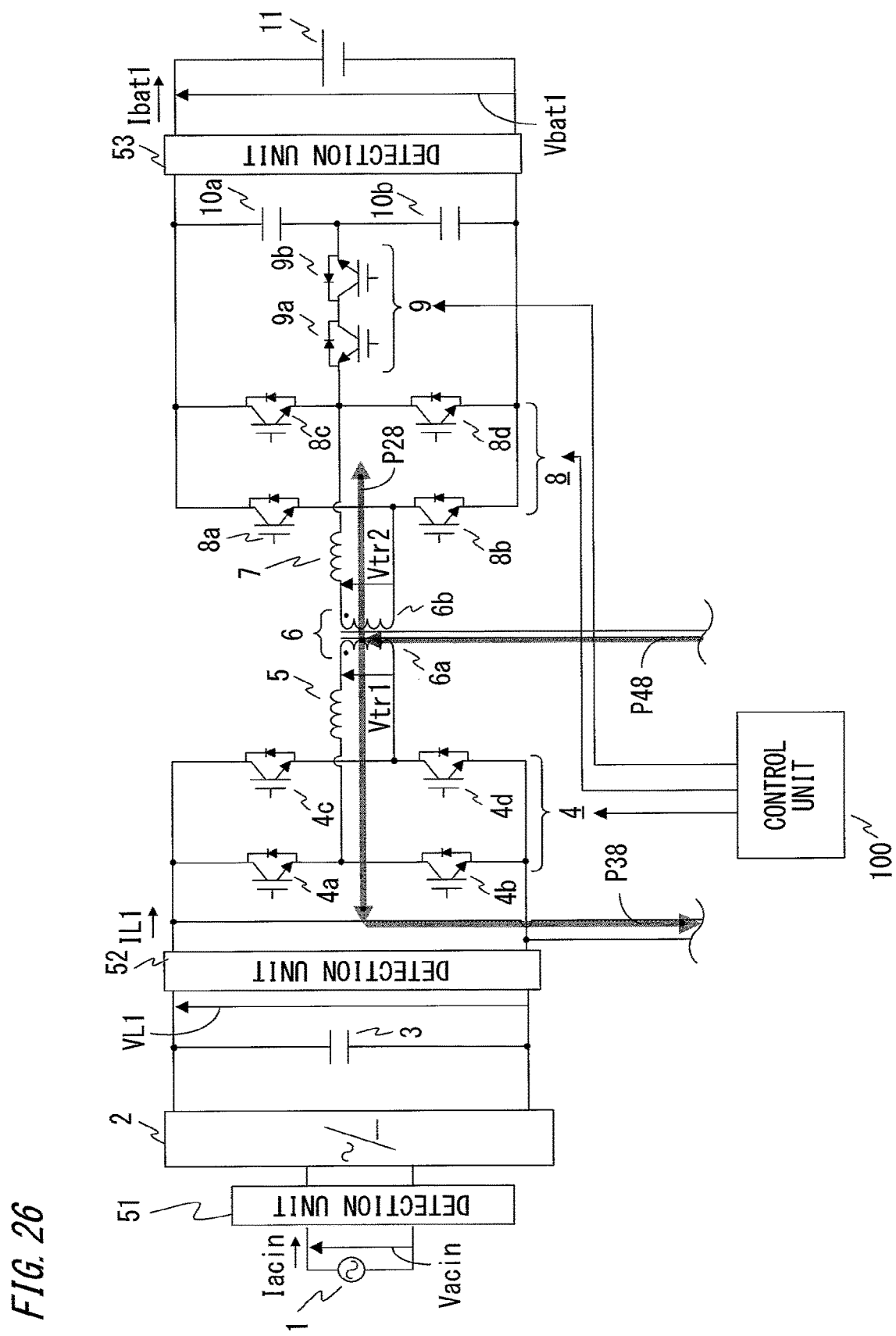
FIG. 26 is a diagram for explaining a power flow in the power conversion device according to embodiment 2 of the present invention.
Figure 27:
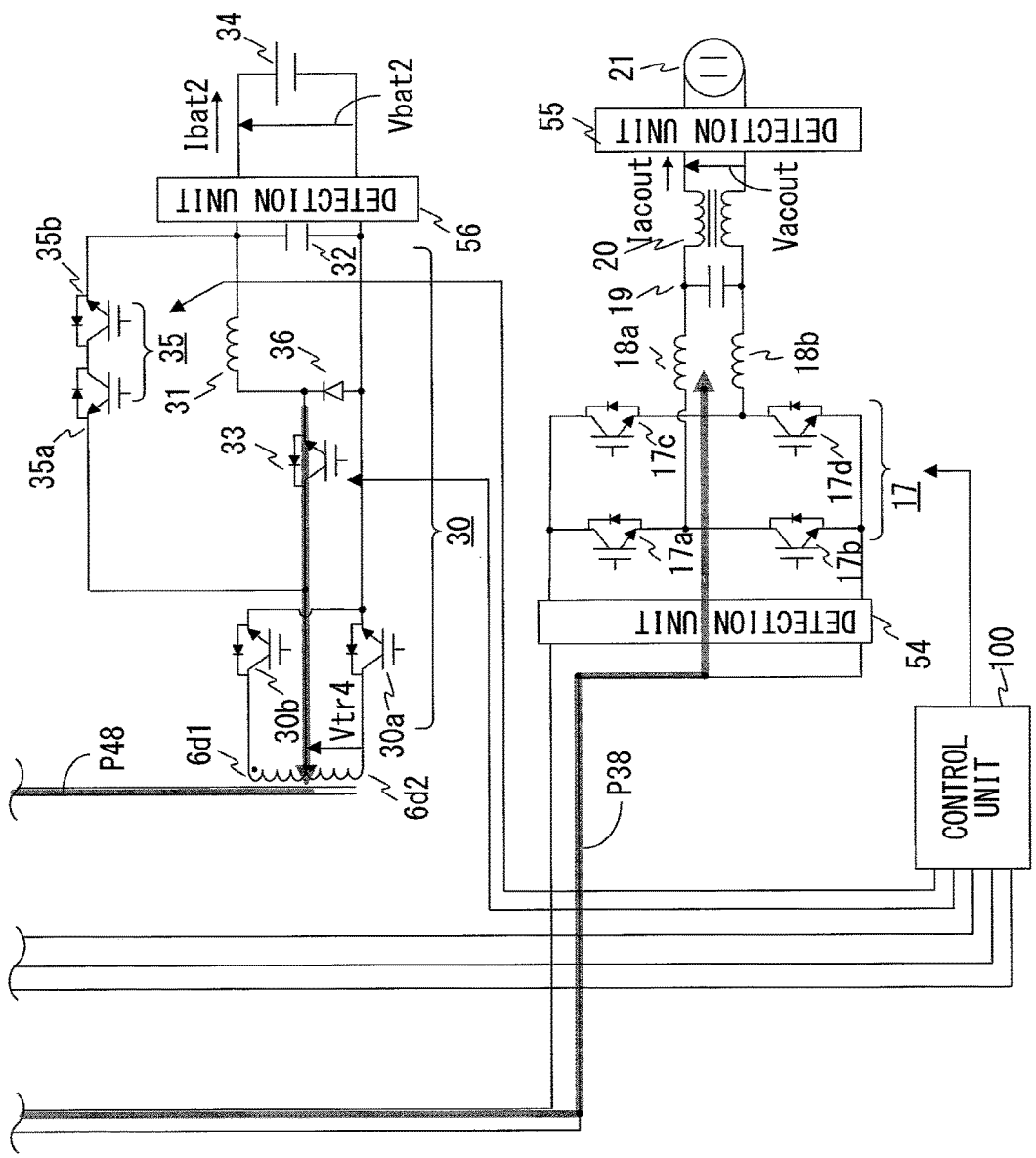
FIG. 27 is a diagram for explaining a power flow in the power conversion device according to embodiment 2 of the present invention.

As shown in FIG. 26 and FIG. 27, in the case where the AC power supply 1 is not connected and the charge amount of the first DC voltage source 11 is insufficient, the second DC voltage source 34 is used as a power supply source, and at this time, discharge power P48 from the second DC voltage source 34 is distributed into charge power P28 for the first DC voltage source 11 and supply power P38 for the AC load connected to the load device connection end 21.

Figure 28:
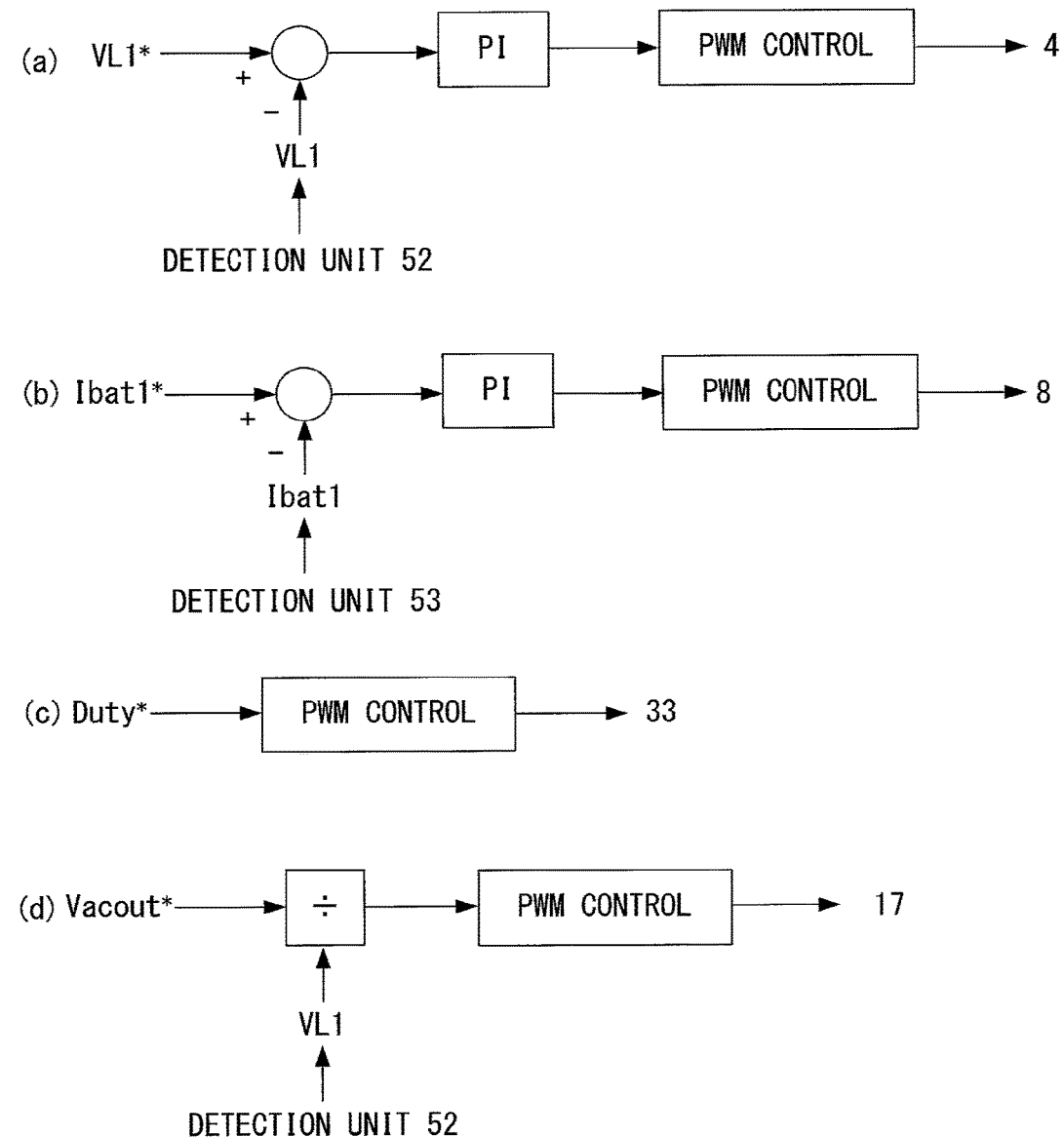
FIG. 28 is a block diagram of the control unit for realizing the power flows shown in FIG. 26 and FIG. 27.

FIG. 28 is a block diagram of the control unit 100 for realizing the power flows shown in FIG. 26 and FIG. 27.

Here, operation of the AC/DC converter 2 is stopped, and the switching element 33 of the fourth switching circuit 30 performs PWM operation at a constant time ratio based on an arbitrary time ratio command value Duty*, thereby discharging the second DC voltage source 34 (see FIG. 28(c)).

For the first switching circuit 4, based on a deviation between the voltage command value VL1* for the capacitor 3 and the voltage detection value VL1 from the voltage current detector 52, proportional integral (PI control) is performed, and then PWM control is performed, thereby controlling the voltage VL1 of the capacitor 3 to be constant (see FIG. 28(a)).

For the second switching circuit 8, based on a deviation between the current command value Ibat1* for the first DC voltage source 11 and the current detection value Ibat1 from the voltage current detector 53, proportional integral control (PI control) is performed, and then PWM control is performed, thereby controlling charge current for the first DC voltage source 11 (see FIG. 28(b)).

The inverter 17 is operated in the same manner as in FIG. 21(d) (see FIG. 28(d)).

In the description of control operation of the control unit 100, the first DC voltage source 11 is controlled by constant current charging, and the second DC voltage source 34 is controlled by constant voltage charging. However, the charging methods for the first DC voltage source 11 and the second DC voltage source 34 are not limited to the above charging methods, but may be determined in accordance with the first and second DC voltage sources 11 and 34. For example, the first DC voltage source 11 may be charged with constant voltage, and the second DC voltage source 34 may be charged with constant current.

In the case of discharging the first DC voltage source 11, the switch 9 may be turned on, the two switching elements 8c and 8d on one arm may be turned off, and the two switching elements 8a and 8b on the other arm may be subjected to PWM control, to perform half-bridge operation, thereby discharging the first DC voltage source 11, or the four switching elements 8a to 8d may be subjected to PWM control to perform full-bridge operation, thereby discharging the first DC voltage source 11.

According to the present embodiment 2, it becomes possible to control the amount of power supplied from the AC power supply 1, the first DC voltage source 11, or the second DC voltage source 34 in accordance with power required by the load, via the transformer 6.

That is, in the case of using only the AC power supply 1 as a power supply source, output voltage of the AC/DC converter 2 is controlled through the AC/DC converter 2, whereby a sum of the load powers can be supplied from the AC power supply 1. In addition, the voltage VL1 of the capacitor 3 on the output side of the AC/DC converter 2 is controlled by one of the switching circuits 8, 13, and 30 provided between the transformer 6 and their respective loads, thereby adjusting power supplied to the load on the subsequent side of each switching circuit 8, 13, 30 that controls the voltage VL1 on the output side of the AC/DC converter 2. Thus, power supplied from the AC power supply 1 can be made constant.

In the case of using only the first DC voltage source 11 or the second DC voltage source 34 as a power supply source, the second switching circuit 8 or the fourth switching circuit 30 is operated with an arbitrary ON time (duty), whereby power can be supplied.

Also in the power conversion device of embodiment 2, as in embodiment 1, if the turns ratio of the transformer 6 is adjusted so that induced voltage from the transformer 6 is lower than the voltage on the load side, supply of power to each load can be stopped by stopping operation of the second switching circuit 8 or the fourth switching circuit 30 provided between the load and the transformer 6.

As described above, as in embodiment 1, the power conversion device according to embodiment 2 can perform power distribution control of input power to multiple outputs, and as necessary, can arbitrarily stop operation of charging the first DC voltage source 11 or the second DC voltage source 34, while supplying power to another load. In addition, in the case where isolation between the AC power supply 1 and the inverter 17 is not necessary, since the DC voltage VL1 obtained by the AC/DC converter 2 can be applied to the inverter 17, the third winding 6c of the transformer 6 can be omitted to reduce the number of turns in windings.

Figure 29:
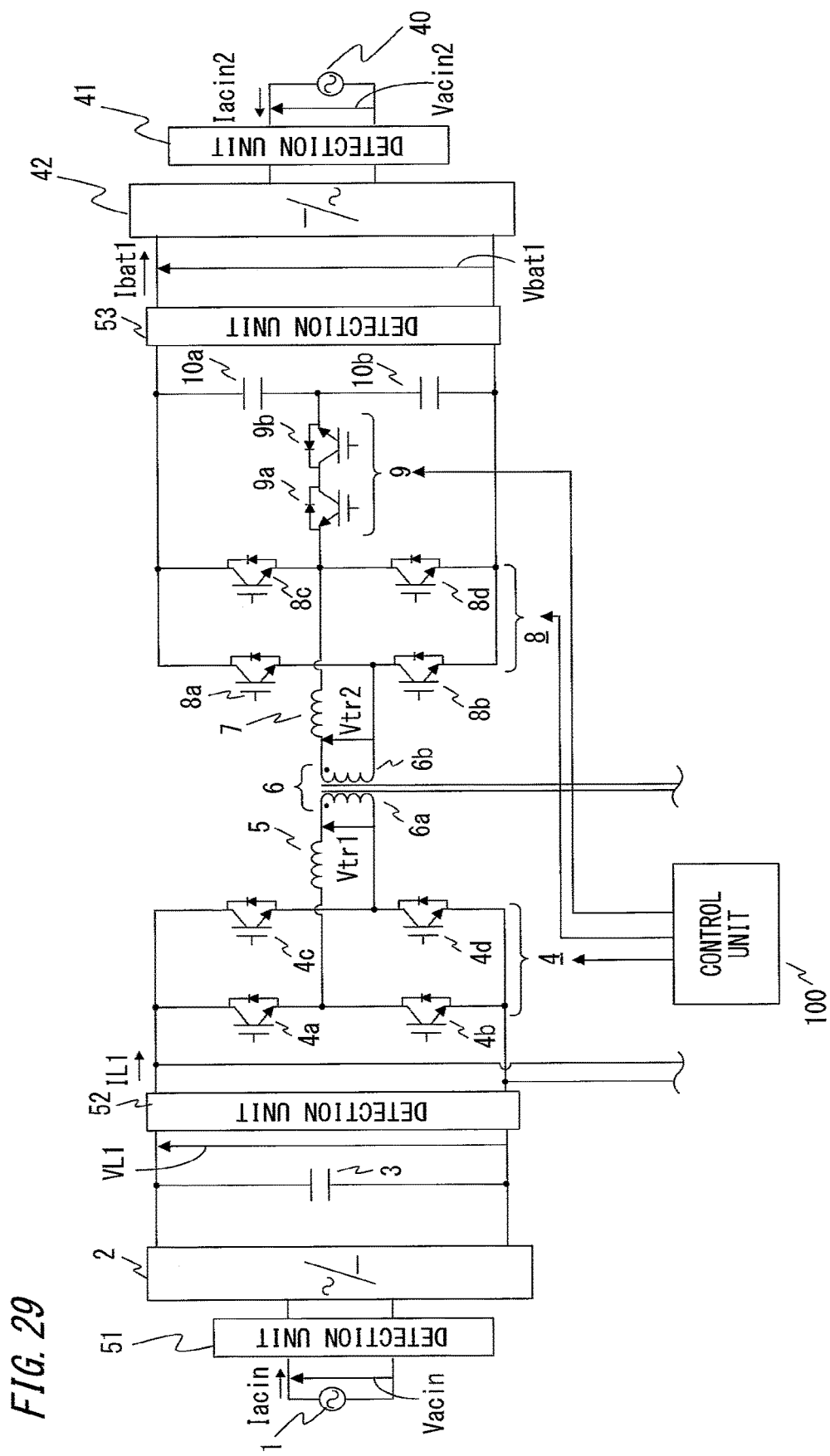
FIG. 29 is a circuit configuration diagram of another power conversion device according to embodiment 2 of the present invention.
Figure 30:
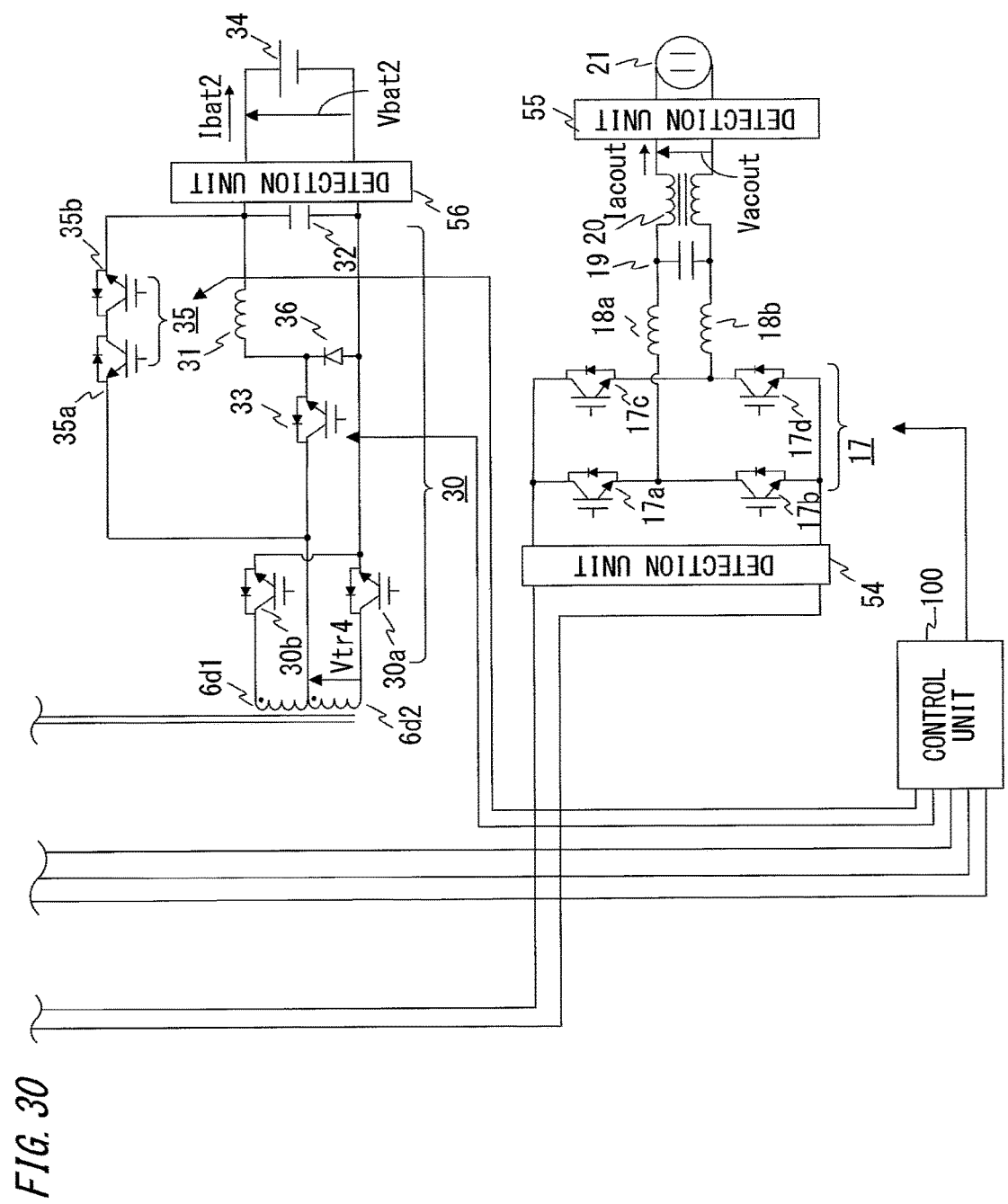
FIG. 30 is a circuit configuration diagram of the other power conversion device according to embodiment 2 of the present invention.

In the circuit configuration diagrams of the power conversion device shown in FIG. 17 and FIG. 18, the first DC voltage source 11 or the second DC voltage source 34 may be replaced with an AC/DC converter capable of bidirectional power conversion and an AC power supply. FIG. 29 and FIG. 30 show circuit configuration diagrams of a power conversion device obtained by replacing the first DC voltage source in the power conversion device shown in FIG. 17 and FIG. 18 with such an AC/DC converter and an AC power supply. That is, in FIG. 29 and FIG. 30, the first DC voltage source 11 in FIG. 17 and FIG. 18 is replaced with an AC power supply 40, a voltage current detector 41 for the AC power supply 40, and an AC/DC converter 42 capable of bidirectional power conversion. In the case where the AC/DC converter 42 capable of bidirectional power conversion regenerates power to the AC power supply 40, the same operation as the above operation in which the first DC voltage source 11 is charged in the circuit configuration in FIG. 17 and FIG. 18 is performed. In the case where the AC/DC converter 42 capable of bidirectional power conversion receives power from the AC power supply 40, the same operation as the above operation in which the first DC voltage source 11 is discharged in the circuit configuration in FIG. 17 and FIG. 18 is performed. The operations in the case where the second DC voltage source 34 in the circuit configuration in FIG. 17 and FIG. 18 is replaced with an AC power supply, a voltage current detector for the AC power supply, and an AC/DC converter capable of bidirectional power conversion are also performed in the same manner as described above.

Embodiment 3

Figure 31:
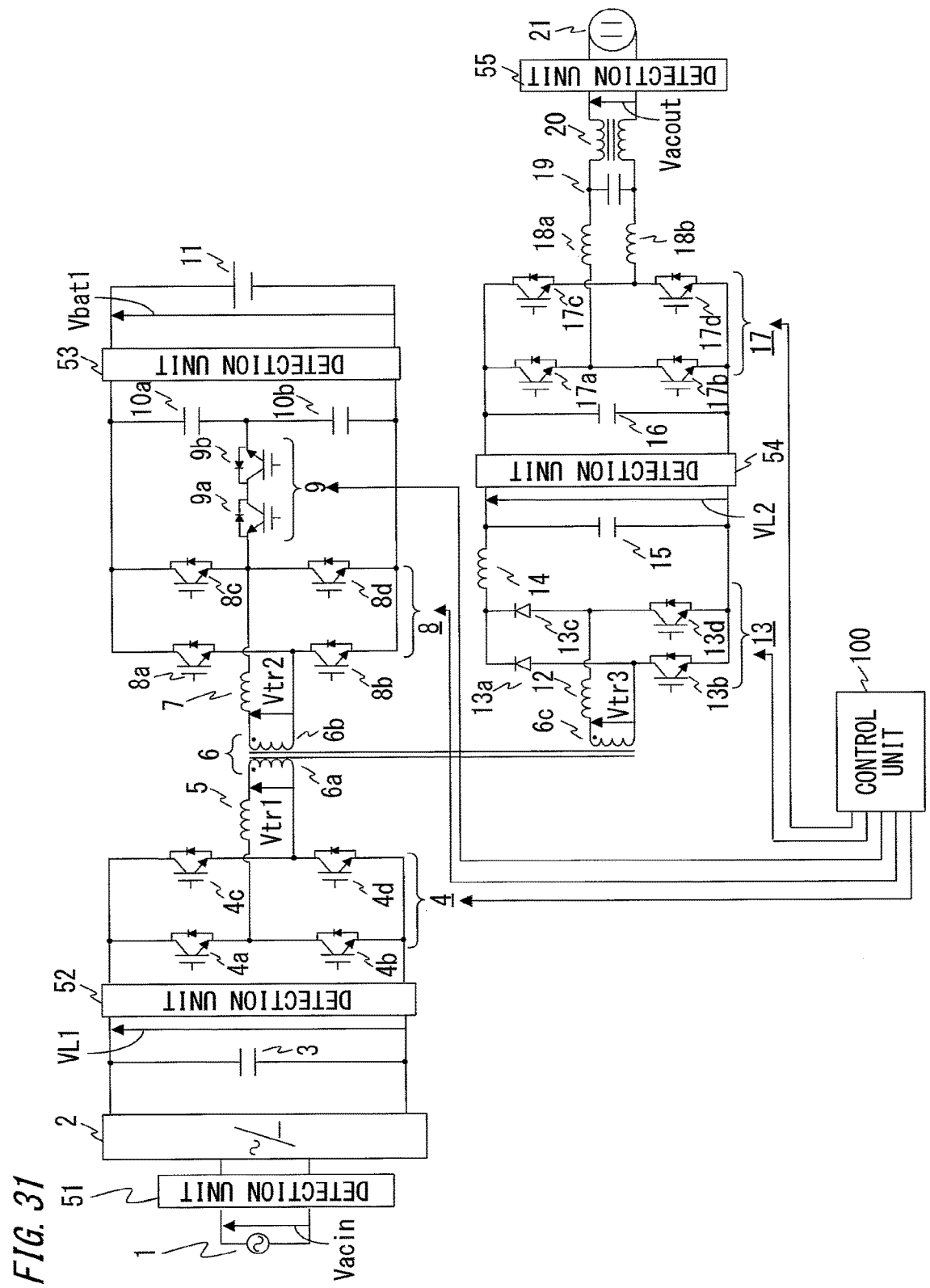
FIG. 31 is a circuit configuration diagram of a power conversion device according to embodiment 3 of the present invention.

FIG. 31 is a circuit configuration diagram of a power conversion device according to embodiment 3 of the present invention. The components that correspond to or are the same as those in embodiment 1 shown in FIG. 1 and FIG. 2 are denoted by the same reference characters.

A feature in embodiment 3 is that the circuit including: the fourth windings 6d1 and 6d2 of the transformer 6; and the fourth switching circuit 30 and the second DC voltage source 34 connected to the windings 6d1 and 6d2, is eliminated from the circuit configuration in embodiment 1 shown in FIG. 1 and FIG. 2. The other configuration is the same as in embodiment 1.

Therefore, except for the operation of the circuit including the fourth switching circuit 30 and the second DC voltage source 34 in embodiment 1, the basic operation is the same as in embodiment 1, and therefore the detailed description thereof is omitted here.

The power conversion device according to embodiment 3 can perform power distribution control of input power to the first DC voltage source 11 and the AC load connected to the load device connection end 21, and as necessary, can arbitrarily stop operation of charging the first DC voltage source 11, while supplying power to the AC load. The configuration in embodiment 3 is applicable to the case where the second DC voltage source 34 as in embodiment 1 is separately provided as an independent power system such as a power supply for a vehicle electric component.

In the circuit configuration diagram of the power conversion device in FIG. 31, the first DC voltage source 11 may be replaced with an AC/DC converter capable of bidirectional power conversion and an AC power supply.

Embodiment 4

Figure 32:
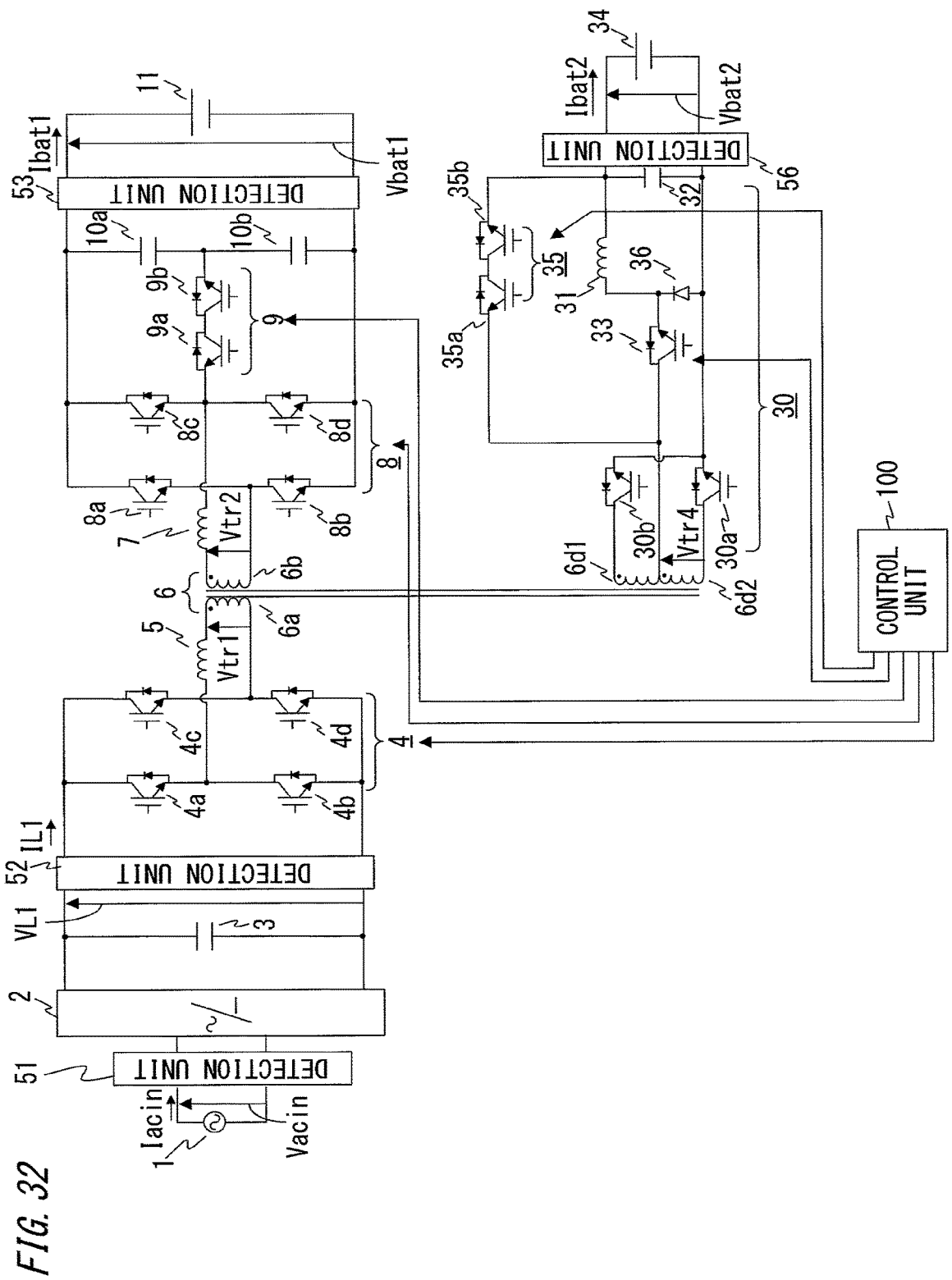
FIG. 32 is a circuit configuration diagram of a power conversion device according to embodiment 4 of the present invention.

FIG. 32 is a circuit configuration diagram of a power conversion device according to embodiment 4 of the present invention. The components that correspond to or are the same as those in embodiment 1 shown in FIG. 1 and FIG. 2 are denoted by the same reference characters.

A feature in embodiment 4 is that the circuit including: the third winding 6c of the transformer 6; and the third switching circuit 13 and the inverter 17 connected to the winding 6c, is eliminated from the circuit configuration in embodiment 1 shown in FIG. 1 and FIG. 2. The other configuration is the same as in embodiment 1.

Therefore, except for the operation of the circuit including the third switching circuit 13 and the inverter 17 in embodiment 1, the basic operation is the same as in embodiment 1, and therefore the detailed description thereof is omitted.

The power conversion device according to embodiment 4 can perform power distribution control of input power to the first and second DC voltage sources 11 and 34, and while supplying power to one of the first and second DC voltage sources 11 and 34, can arbitrarily stop operation of charging the other DC voltage source as necessary. The configuration in embodiment 4 is applicable to the case where it is not particularly necessary to connect such an AC load as in embodiment 1 to the load device connection end 21 and therefore the circuit including the third coil 6c, the third switching circuit 13, and the inverter 17 can be omitted.

In the circuit configuration diagram of the power conversion device in FIG. 32, the first DC voltage source 11 or the second DC voltage source 34 may be replaced with an AC/DC converter capable of bidirectional power conversion and an AC power supply.

The present invention is not limited only to the configurations shown in the above embodiments 1 to 4. Without deviating from the gist of the present invention, the configurations in embodiments 1 to 4 may be combined as appropriate, or each configuration may be partially modified or omitted.

The invention claimed is:

1. A power conversion device comprising:
    a transformer composed of three or more windings magnetically coupled with each other, the three or more windings including a first winding;
    a first switching circuit connected to the first winding;
    an AC/DC converter having a DC side connected to an input part of the first switching circuit, and converting input power from an AC power supply to DC;
    a first detector for detecting DC side voltage of the AC/DC converter; and
    a switching circuit and a load which are connected to at least one load side winding including at least one of the three or more windings besides the first winding, wherein
    the first switching circuit supplies AC power to the first winding at a predetermined time ratio, and the switching circuit connected to the at least one load side winding controls voltage on an output side of the AC/DC converter, based on a detected voltage value detected by the first detector and a target voltage value.

2. The power conversion device according to claim 1, wherein
    the transformer is composed of the first winding, a second winding, a third winding, and a fourth winding magnetically coupled with each other,
    the first switching circuit is connected to the first winding,
    a second switching circuit is connected between the second winding and a first DC voltage source,
    a third switching circuit is connected between the third winding and an inverter,
    a fourth switching circuit is connected between the fourth winding and a second DC voltage source,
    the first switching circuit is connected to a DC output end of the AC/DC converter connected to the AC power supply,
    wherein the power conversion device includes
    the first detector for detecting DC side voltage of the AC/DC converter,
    a second detector for detecting a voltage or current value of the first DC voltage source,
    a third detector for detecting DC side voltage of the third switching circuit, a fourth detector for detecting a voltage or current value of the second DC voltage source, and in the case where the first DC voltage source, the second DC voltage source, and a device connected to the inverter are considered to be the load, the first switching circuit supplies AC power to the first winding at the predetermined time ratio, and at least one of the second to fourth switching circuits controls the voltage on the output side of the AC/DC converter, based on both the detected voltage value detected by the first detector and the target voltage value, and switching circuits of the second to fourth switching circuits other than the at least one of the second to fourth switching circuits respectively control the voltage or current on the load side, based on each detected value detected by the second to fourth detectors that are connected to the other switching circuits and an each target value.

3. The power conversion device according to claim 1, wherein the transformer is composed of the first winding, a second winding, and a fourth winding magnetically coupled with each other, the first switching circuit is connected to the first winding, a second switching circuit is connected between the second winding and a first DC voltage source, a fourth switching circuit is connected between the fourth winding and a second DC voltage source, the first switching circuit and an inverter are connected in parallel to an output end of the AC/DC converter connected to the AC power supply, wherein the power conversion device includes the first detector for detecting DC side voltage of the AC/DC converter, a second detector for detecting a voltage or current value of the first DC voltage source, a fourth detector for detecting a voltage or current value of the second DC voltage source, and in the case where the first DC voltage source, the second DC voltage source, and a device connected to the inverter are considered to be the load, the first switching circuit supplies AC power to the first winding at the predetermined time ratio, one of the second and the fourth switching circuits controls the voltage on the output side of the AC/DC converter, based on both the detected voltage value detected by the first detector and the target voltage value, and the other of the second and the fourth switching circuits controls the voltage or current on the load side, based on both a detected value detected by the second or the fourth detector that is connected to the other of the second and the fourth switching circuits and an each target value.

4. The power conversion device according to claim 1, wherein the transformer is composed of the first winding, a second winding, and a third winding magnetically coupled with each other, the first switching circuit is connected to the first winding, a second switching circuit is connected between the second winding and a first DC voltage source, a third switching circuit is connected between the third winding and an inverter, the first switching circuit is connected to an output end of the AC/DC converter connected to the AC power supply, wherein the power conversion device includes the first detector for detecting DC side voltage of the AC/DC converter, a second detector for detecting a voltage or current value of the first DC voltage source, a third detector for detecting DC side voltage of the third switching circuit, and in the case where the first DC voltage source and a device connected to the inverter are considered to be the load, the first switching circuit supplies AC power to the first winding at the predetermined time ratio, one of the second and the third switching circuits controls the voltage on the output side of the AC/DC converter, based on both the detected voltage value detected by the first detector and the target voltage value, and the other of the second and the third switching circuits controls the voltage or current on the load side, based on both a detected value detected by the second or the third detectors that is connected to the other of the second and the third switching circuits and an each target value.

5. The power conversion device according to claim 1, wherein the transformer is composed of the first winding, a second winding, and a fourth winding magnetically coupled with each other, the first switching circuit is connected to the first winding, a second switching circuit is connected between the second winding and a first DC voltage source, a fourth switching circuit is connected between the fourth winding and a second DC voltage source, the first switching circuit is connected to an output end of the AC/DC converter connected to the AC power supply, wherein the power conversion device includes the first detector for detecting DC side voltage of the AC/DC converter, a second detector for detecting a voltage or current value of the first DC voltage source, a fourth detector for detecting a voltage or current value of the second DC voltage source, and in the case where the first DC voltage source and the second DC voltage source are considered to be the load, the first switching circuit supplies AC power to the first winding at the predetermined time ratio, one of the second and the fourth switching circuits controls the voltage on the output side of the AC/DC converter, based on both the detected voltage value detected by the first detector and the target voltage value, and the other of the second and the fourth switching circuits controls the voltage or current on the load side, based on both a detected value detected by the second or the fourth detector that is connected to the other of the second and the fourth switching circuits and a target value.

6. The power conversion device according to claim 1, wherein, in a state in which the AC/DC converter rectifies the input power from the AC power supply and the first switching circuit supplies power to the transformer, the AC/DC converter performs control based on a constant target value for an AC current effective value so as to receive constant power from the AC power supply, one of the switching circuits on the load side connected via the transformer controls output voltage of the AC/DC converter, based on a detected value and a predetermined target value of the output voltage, and another switching circuit on the load side connected via the transformer controls output voltage or output current on the load side, based on both a detected value and a predetermined target value of the output voltage or output current, whereby, of power received from the AC power supply, power supplied to the load is adjusted while power is supplied to another load.

7. The power conversion device according to claim 2, wherein, in a case of using only the first DC voltage source as a power supply source, in a state in which operation of the AC/DC converter and the first switching circuit are stopped, the second switching circuit performs switching operation based on a predetermined time ratio, thereby supplying power of the first DC voltage source to the transformer, and another switching circuit on the load side connected via the transformer controls output voltage or output current on the load side, based on both a detected value and a predetermined target value of the output voltage or output current.

8. The power conversion device according to claim 2, wherein, in a case of using only the second DC voltage source as a power supply source, in a state in which operation of the AC/DC converter and the first switching circuit are stopped, the fourth switching circuit performs switching operation based on a predetermined time ratio, thereby supplying power of the second DC voltage source to the transformer, and another switching circuit on the load side connected via the transformer controls output voltage or output current on the load side, based on both a detected value and a predetermined target value of the output voltage or output current.

9. The power conversion device according to claim 2, wherein a turns ratio is adjusted so that voltage induced on the second winding, the third winding, or the fourth winding of the transformer is smaller than DC voltage at a stage subsequent to the second switching circuit, the third switching circuit, or the fourth switching circuit on the load side connected via the transformer, and by stopping operation of the switching circuit on the load side, supply of power to the load is stopped.

10. The power conversion device according to claim 1, wherein any of the switching circuits connected to the transformer, the switching circuit being the second, the third, or the fourth switching circuit that does not control the output voltage of the AC/DC converter and output voltage or output current on the load side, is configured with a passive element.

11. The power conversion device according to claim 3, wherein, in a case of using only the first DC voltage source as a power supply source, in a state in which operation of the AC/DC converter and the first switching circuit are stopped, the second switching circuit performs switching operation based on a predetermined time ratio, thereby supplying power of the first DC voltage source to the transformer, and another switching circuit on the load side connected via the transformer controls output voltage or output current on the load side, based on both a detected value and a predetermined target value of the output voltage or output current.

12. The power conversion device according to claim 4, wherein, in a case of using only the first DC voltage source as a power supply source, in a state in which operation of the AC/DC converter and the first switching circuit are stopped, the second switching circuit performs switching operation based on a predetermined time ratio, thereby supplying power of the first DC voltage source to the transformer, and another switching circuit on the load side connected via the transformer controls output voltage or output current on the load side, based on both a detected value and a predetermined target value of the output voltage or output current.

13. The power conversion device according to claim 5, wherein, in a case of using only the first DC voltage source as a power supply source, in a state in which operation of the AC/DC converter and the first switching circuit are stopped, the second switching circuit performs switching operation based on a predetermined time ratio, thereby supplying power of the first DC voltage source to the transformer, and another switching circuit on the load side connected via the transformer controls output voltage or output current on the load side, based on both a detected value and a predetermined target value of the output voltage or output current.

14. The power conversion device according to claim 3, wherein, in a case of using only the second DC voltage source as a power supply source, in a state in which operation of the AC/DC converter and the first switching circuit are stopped, the fourth switching circuit performs switching operation based on a predetermined time ratio, thereby supplying power of the second DC voltage source to the transformer, and another switching circuit on the load side connected via the transformer controls output voltage or output current on the load side, based on both a detected value and a predetermined target value of the output voltage or output current.

15. The power conversion device according to claim 5, wherein, in a case of using only the second DC voltage source as a power supply source, in a state in which operation of the AC/DC converter and the first switching circuit are stopped, the fourth switching circuit performs switching operation based on a predetermined time ratio, thereby supplying power of the second DC voltage source to the transformer, and the other switching circuit on the load side connected via the transformer controls output voltage or output current on the load side, based on both a detected value and a predetermined target value of the output voltage or output current.

* * * * *